(12) United States Patent
Latorre et al.

(10) Patent No.: US 11,203,554 B2
(45) Date of Patent: Dec. 21, 2021

(54) ANTICAKING AGENT FOR HYGROSCOPIC FERTILIZER

(71) Applicant: Imerys USA, Inc., Roswell, GA (US)

(72) Inventors: Arthur Latorre, Sao Paulo (BR); Liege Biesuz, Vila Saturnia (BR); Leandro Rocha, Sao Paulo (BR); David Ian Gittins, San Jose, CA (US)

(73) Assignee: IMERYS USA, INC., Roswell, GA (US)

( * ) Notice: Subject to any disclaimer, the term of this patent is extended or adjusted under 35 U.S.C. 154(b) by 69 days.

(21) Appl. No.: 16/705,397

(22) Filed: Dec. 6, 2019

(65) Prior Publication Data

US 2020/0181037 A1  Jun. 11, 2020

Related U.S. Application Data

(60) Provisional application No. 62/776,594, filed on Dec. 7, 2018.

(51) Int. Cl.
| | |
|---|---|
| *C05C 9/02* | (2006.01) |
| *C05G 3/30* | (2020.01) |
| *C05C 9/00* | (2006.01) |
| *C05G 5/10* | (2020.01) |
| *C09K 3/14* | (2006.01) |

(52) U.S. Cl.
CPC ............ *C05G 3/30* (2020.02); *C05C 9/00* (2013.01); *C05C 9/02* (2013.01); *C05G 5/10* (2020.02); *C09K 3/1436* (2013.01)

(58) Field of Classification Search
None
See application file for complete search history.

(56) References Cited

U.S. PATENT DOCUMENTS

| | | | | |
|---|---|---|---|---|
| 3,679,391 A * | 7/1972 | Jack et al. | ............... | C05G 3/20 71/64.12 |
| 4,082,533 A * | 4/1978 | Wittenbrook | ............ | C05G 5/37 71/28 |
| 4,565,564 A * | 1/1986 | Backlund | ................ | C05C 9/005 71/28 |
| 5,676,729 A * | 10/1997 | Elrod | ...................... | C05C 9/005 71/28 |
| 5,782,951 A * | 7/1998 | Aylen | ...................... | C05C 9/005 71/28 |
| 5,984,994 A * | 11/1999 | Hudson | .................... | C05G 5/36 71/28 |
| 6,193,775 B1 * | 2/2001 | Fujita | ....................... | C05G 5/38 71/27 |
| 2003/0051523 A1* | 3/2003 | Tabei | ....................... | C05G 5/37 71/64.02 |
| 2003/0164015 A1* | 9/2003 | Pildysh | ................... | C05G 5/40 71/31 |
| 2004/0016276 A1* | 1/2004 | Wynnyk | ................. | C05G 5/37 71/64.11 |

(Continued)

*Primary Examiner* — Wayne A Langel
(74) *Attorney, Agent, or Firm* — Finnegan, Henderson, Farabow, Garrett & Dunner, LLP

(57) ABSTRACT

An anticaking agent having a coating and a mineral matrix of a coarse mineral and a fine mineral is described. A method of making the anticaking agent is disclosed, as well as a method of applying the anticaking agent to a hygroscopic fertilizer to reduce caking in high temperature and high humidity environments. The coarse mineral may be a diatomaceous earth.

21 Claims, 12 Drawing Sheets

| Sample | Type | Amount | Type | Amount | Coating | Amount | Qualitative Analysis Anticaking effect | Qualitative Analysis Compatibilizer effect |
|---|---|---|---|---|---|---|---|---|
| Control (Test Line 5) | Talc | 100% | - | - | - | - | * | - |
| Test Line 42 | Calcined Kaolin | 46.25% | DE | 46.25% | Silicone (2:1) Silquest Silane | 7.5% | ***** | ***** |
| Test Line 47 | Calcined Kaolin | 47.5% | DE | 47.5% | Comarlub (Sodium Soap) | 5% | ***** | ** |
| Test Line 54 | Calcined Kaolin | 46.25% | DE | 46.25% | Comarlub (2:1) Silquest Silane | 7.5% | ***** | * |

(56) References Cited

U.S. PATENT DOCUMENTS

| | | | | |
|---|---|---|---|---|
| 2009/0317468 A1* | 12/2009 | Letmathe | ............... | A01N 25/12 |
| | | | | 424/484 |
| 2014/0366598 A1* | 12/2014 | Carmo | ...................... | C05C 9/00 |
| | | | | 71/29 |
| 2017/0333518 A1* | 11/2017 | Uekita | .................... | C05F 11/10 |
| 2018/0319670 A1* | 11/2018 | Riley | ....................... | B01J 20/10 |

* cited by examiner

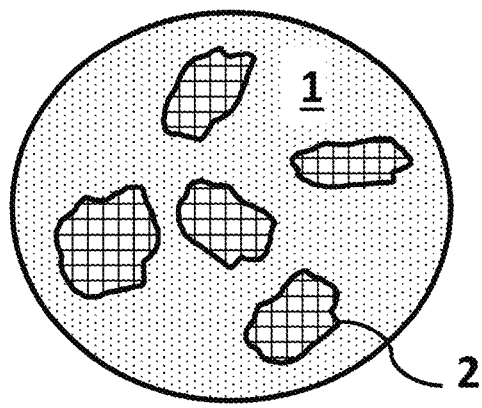
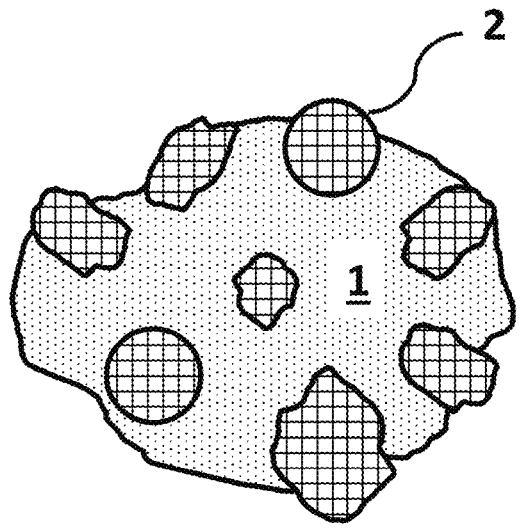
FIG. 1A                FIG. 1B
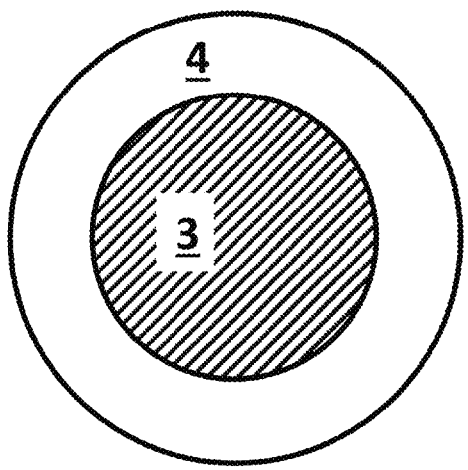
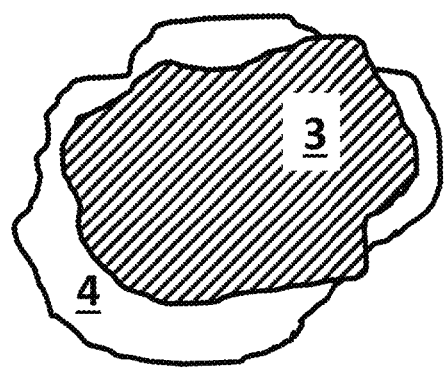
FIG. 2A                FIG. 2B

| Mineral Matrix (A and/or B) | | | | Coating | | Qualitative Analysis | Type |
|---|---|---|---|---|---|---|---|
| A | | B | | C | | | |
| Name | Amount | Name | Amount | Name | Amount | | |
| Alphatex HP | 100% | - | - | - | - | * | A |
| Luzenac A3 | 100% | - | - | - | - | * | A |
| Kaolin NP | 50% | EcoFlat Fines | 50% | - | - | * | A&B |
| Barralim Plus | 97.5% | - | - | Silicone | 2.5% | * | A&C |
| Calcium Carbonate | 100% | EcoFlat Fines | 100% | - | - | * | B |
| Itasil 2115G | 97.5% | - | - | Silquest Silane | 2.5% | ** | A&C |
| itasilex 3100 | 97.5% | - | - | Stearin (1:1) Silicone | 2.5% | * | A&C |
| Itatalc 200A | 97.5% | - | - | Silquest Silane | 2.5% | * | A&C |
| Itatalc 635ES | 97.5% | - | - | Silquest Silane | 2.5% | ** | A&C |
| Sac 200EA | 97.5% | - | - | Silquest Silane | 2.5% | ** | A&C |
| Saca B | 97.5% | - | - | Silquest Silane | 2.5% | * | A&C |
| Saca C | 97.5% | - | - | Silquest Silane | 2.5% | * | A&C |
| Saca C1 | 97.5% | - | - | Silicone | 2.5% | * | A&C |
| Saca P | 97.5% | - | - | Silquest Silane | 2.5% | * | A&C |
| Saca SFC | 97.5% | - | - | Silquest Silane | 2.5% | * | A&C |
| - | - | EcoFlat Fines | 100% | - | - | * | B |
| - | - | EcoFlat Fines | 97.5% | Nujol Oil + Epoxidated Soybean Oil + DMS 350 (1:1:1) | 2.5% | * | B&C |
| - | - | EcoFlat Fines | 97.5% | Silicone (1:1) Epoxidated Soybean Oil | 2.5% | * | B&C |
| - | - | EcoFlat Fines | 97.5% | Nujol Oil (1:1) Epoxidated Soybean Oil | 2.5% | * | B&C |
| - | - | EcoFlat Fines | 97.5% | Nujol Oil (1:1) DMS 350 | 2.5% | * | B&C |
| - | - | EcoFlat Fines | 90% | Silicone | 10% | ** | B&C |
| - | - | EcoFlat Fines | 97.5% | Castor Oil Extra Palle | 2.5% | * | B&C |
| - | - | EcoFlat Fines | 97.5% | Silicone | 2.5% | * | B&C |
| - | - | EcoFlat Fines | 97.5% | Epoxidated Soybean Oil | 2.5% | * | B&C |
| - | - | EcoFlat Fines | 97.5% | Hydrogenated Castor Oil | 2.5% | * | B&C |
| - | - | EcoFlat Fines | 97.5% | Nujol Oil | 2.5% | * | B&C |
| - | - | EcoFlat Fines | 95% | 2.5% Nujol Oil + 2.5% DMS 350 | 5.0% | ** | B&C |
| - | - | EcoFlat Fines | 95% | 2.5% Nujol Oil + 2.5% DMS 350 | 5.0% | *** | B&C |
| - | - | EcoFlat Fines | 97.5% | Silquest Silane | 2.5% | *** | B&C |
| - | - | EcoFlat Fines | 94% | Silicone blend | 6.0% | *** | B&C |
| - | - | EcoFlat Fines | 94% | Silicone blend | 6.0% | *** | B&C |
| - | - | EcoFlat Fines | 95% | Silicone | 5.0% | *** | B&C |
| - | - | EcoFlat Fines | - | Silicone blend | 12.0% | *** | B&C |
| - | - | EcoFlat Fines | - | Silicone blend | 12.0% | *** | B&C |
| - | - | EcoFlat Fines | 92.5% | Silicone | 7.5% | *** | B&C |
| - | - | EcoFlat Fines | - | Silicone | 5.0% | *** | C |
| Alphatex HP | 47.5% | EcoFlat Fines | 47.5% | Silicone | 5.0% | **** | A&B&C |
| Alphatex HP | 46.25% | EcoFlat Fines | 46.25% | Silicone (2:1) Silquest Silane | 7.5% | ***** | A&B&C |
| Talc #635 | 47.5% | EcoFlat Fines | 47.5% | Silicone | 5.0% | **** | A&B&C |
| Talc #635 | 46.25% | EcoFlat Fines | 46.25% | Silicone (2:1) Silquest Silane | 7.5% | **** | A&B&C |

FIG. 3

Particle size distribution data x : Diameter / μm
Q3 : Cumulative Volume / %
q3 : Histogram Volume / %

Diameter at 10% passing: 0.84 μm
Diameter at 50% passing: 3.80 μm
Diameter at 99% passing: 25.45 μm
Median diameter: 5.66 μm

| | | | | | | | | | | |
|---|---|---|---|---|---|---|---|---|---|---|
| x | 0.04 | 0.07 | 0.10 | 0.20 | 0.30 | 0.40 | 0.50 | 0.60 | 0.70 | 0.80 |
| Q3 | 0.15 | 0.49 | 0.75 | 1.71 | 2.88 | 3.87 | 4.79 | 5.95 | 7.41 | 9.24 |
| q3 | 0.04 | 0.05 | 0.06 | 0.11 | 0.23 | 0.28 | 0.33 | 0.51 | 0.76 | 1.10 |
| x | 0.90 | 1.00 | 1.10 | 1.20 | 1.30 | 1.40 | 1.60 | 1.80 | 2.00 | 2.20 |
| Q3 | 11.22 | 13.28 | 15.38 | 17.45 | 19.48 | 21.43 | 25.07 | 28.35 | 31.29 | 33.92 |
| q3 | 1.35 | 1.57 | 1.77 | 1.91 | 2.03 | 2.11 | 2.18 | 2.23 | 2.24 | 2.21 |
| x | 2.40 | 2.60 | 2.80 | 3.00 | 3.20 | 3.40 | 3.60 | 3.80 | 4.00 | 4.30 |
| Q3 | 36.31 | 38.54 | 40.63 | 42.62 | 44.54 | 46.40 | 48.20 | 49.96 | 51.67 | 54.17 |
| q3 | 2.20 | 2.23 | 2.26 | 2.31 | 2.38 | 2.46 | 2.52 | 2.61 | 2.67 | 2.77 |
| x | 4.60 | 5.00 | 5.30 | 5.60 | 6.00 | 6.50 | 7.00 | 7.50 | 8.00 | 8.50 |
| Q3 | 56.56 | 59.58 | 61.71 | 63.72 | 66.23 | 69.11 | 71.71 | 74.07 | 76.22 | 78.16 |
| q3 | 2.84 | 2.90 | 2.93 | 2.93 | 2.92 | 2.88 | 2.81 | 2.74 | 2.67 | 2.56 |
| x | 9.00 | 10.00 | 11.00 | 12.00 | 13.00 | 14.00 | 15.00 | 16.00 | 17.00 | 18.00 |
| Q3 | 79.92 | 82.97 | 85.47 | 87.55 | 89.31 | 90.83 | 92.15 | 93.30 | 94.32 | 95.21 |
| q3 | 2.47 | 2.32 | 2.10 | 1.92 | 1.76 | 1.64 | 1.53 | 1.43 | 1.35 | 1.25 |
| x | 19.00 | 20.00 | 21.00 | 22.00 | 23.00 | 25.00 | 28.00 | 30.00 | 32.00 | 34.00 |
| Q3 | 96.00 | 96.68 | 97.28 | 97.79 | 98.23 | 98.90 | 99.53 | 99.76 | 99.89 | 99.97 |
| q3 | 1.17 | 1.06 | 0.99 | 0.88 | 0.79 | 0.64 | 0.45 | 0.27 | 0.16 | 0.11 |
| x | 36.00 | 38.00 | 40.00 | 43.00 | 45.00 | 50.00 | 53.00 | 56.00 | 60.00 | 63.00 |
| Q3 | 100.00 | 100.00 | 100.00 | 100.00 | 100.00 | 100.00 | 100.00 | 100.00 | 100.00 | 100.00 |
| q3 | 0.04 | 0.00 | 0.00 | 0.00 | 0.00 | 0.00 | 0.00 | 0.00 | 0.00 | 0.00 |
| x | 66.00 | 71.00 | 75.00 | 80.00 | 85.00 | 90.00 | 95.00 | 100.0 | 112.0 | 125.0 |
| Q3 | 100.00 | 100.00 | 100.00 | 100.00 | 100.00 | 100.00 | 100.00 | 100.00 | 100.00 | 100.00 |
| q3 | 0.00 | 0.00 | 0.00 | 0.00 | 0.00 | 0.00 | 0.00 | 0.00 | 0.00 | 0.00 |
| x | 130.0 | 140.0 | 150.0 | 160.0 | 170.0 | 180.0 | 190.0 | 200.0 | 212.0 | 224.0 |
| Q3 | 100.00 | 100.00 | 100.00 | 100.00 | 100.00 | 100.00 | 100.00 | 100.00 | 100.00 | 100.00 |
| q3 | 0.00 | 0.00 | 0.00 | 0.00 | 0.00 | 0.00 | 0.00 | 0.00 | 0.00 | 0.00 |
| x | 240.0 | 250.0 | 280.0 | 300.0 | 315.0 | 355.0 | 400.0 | 425.0 | 450.0 | 500.0 |
| Q3 | 100.00 | 100.00 | 100.00 | 100.00 | 100.00 | 100.00 | 100.00 | 100.00 | 100.00 | 100.00 |
| q3 | 0.00 | 0.00 | 0.00 | 0.00 | 0.00 | 0.00 | 0.00 | 0.00 | 0.00 | 0.00 |

FIG. 4B

| Sample | Type | Amount | Type | Amount | Coating | Amount | Qualitative Analysis Anticaking effect | Qualitative Analysis Compatibilizer effect |
|---|---|---|---|---|---|---|---|---|
| Control (Test Line 5) | Talc | 100% | - | - | - | - | * | - |
| Test Line 42 | Calcined Kaolin | 46.25% | DE | 46.25% | Silicone (2:1) Silquest Silane | 7.5% | ***** | ***** |
| Test Line 47 | Calcined Kaolin | 47.5% | DE | 47.5% | Comarlub (Sodium Soap) | 5% | ***** | ** |
| Test Line 54 | Calcined Kaolin | 46.25% | DE | 46.25% | Comarlub (2:1) Silquest Silane | 7.5% | ***** | * |

FIG. 10

ANTICAKING AGENT FOR HYGROSCOPIC FERTILIZER

CROSS-REFERENCE TO RELATED APPLICATION

This application is based upon and claims the benefit of priority to U.S. Provisional Application No. 62/776,594, filed on Dec. 7, 2018, the entirety of which is incorporated herein by reference.

BACKGROUND OF THE INVENTION

Technical Field

The present invention relates to an additive that when mixed with a fertilizer, reduces caking in high humidity conditions.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many salts and oxides, among them components of mixed fertilizers such as urea, potassium chloride, and common nitrogenous salts (ammonium nitrate, ammonium sulfate, sodium nitrate, and diammonium phosphate) are hygroscopic and therefore tend to cake or coalesce when stored, particularly at elevated humidity and temperature. Such coalescence and the resulting agglomeration are believed to be caused by adsorption of moisture on the surfaces of the hygroscopic particles. This absorbed moisture dissolves some of the product and forms a coating over the surface of each particle. Subsequent recrystallization of the fertilizer from the coating, which can be caused by drying of the particles or changes in humidity, can result in the formation of crystal bridges of the product between adjacent particles. When such particles become so linked, the material lumps and has a reduced flowability. However, using a smaller granule size may not be helpful, as the finer the size of the hygroscopic particles, the greater the tendency for the particles to coalesce. Fertilizer materials which have agglomerated are not amenable to conventional bulk storage and handling techniques and, after storage, cannot be spread with conventional mechanical spreaders. For some fertilizers, uneven spreading can be both wasteful and damaging to crops.

To reduce caking, hygroscopic fertilizers may be produced in the form of granules which are coated or dusted with powdered minerals such as talc or chalk to prevent absorption of moisture. However, since according to these methods relatively large amounts of one or more of these anticaking agents must be added, considerable dust is developed when the coated fertilizer particles are spread. Also, the nutrient content of the fertilizer may be reduced.

In view of the foregoing, one objective of the present invention is to provide an anticaking agent made from a coarse mineral, one or more fine minerals, and a coating.

BRIEF SUMMARY OF THE INVENTION

According to a first aspect, the present disclosure relates to an anticaking agent made of 20-80 wt % coarse mineral, having a median particle diameter ($d_{50}$) in a range of 1-20 µm; 20-80 wt % one or more fine minerals, having a median particle diameter ($d_{50}$) in a range of 500 nm-4 µm; and 1-30 wt % coating, each weight percentage relative to a total weight of the anticaking agent. The anticaking agent has median particle diameter in a range of 2-50 µm. The coarse mineral and the one or more fine minerals comprise a mineral selected from the group consisting of perlite, diatomaceous earth, talc, calcium carbonate, kaolin, and calcined kaolin. The coarse mineral comprises a different mineral than the one or more fine minerals. The coating is silicone oil, silane, or both, and the coarse mineral and the one or more fine minerals form a mineral matrix held together by the coating.

In one embodiment, the coarse mineral is diatomaceous earth comprising at least 94 wt % silica ($SiO_2$), and less than 1 wt % crystalline silica, each relative to a total weight of the diatomaceous earth.

In a further embodiment, the diatomaceous earth can be a natural amorphous silica product derived from diatomaceous earth.

In a further embodiment, the one or more fine minerals consists of talc, calcined kaolin, or both, and the coating comprises silicone oil, silane, or both.

In a further embodiment, the silane comprises octyltriethoxysilane and/or vinyltrimethoxysilane, and the silicone oil comprises polydimethylsiloxane.

In a further embodiment, the coating consists of silicone oil and silane.

According to a second aspect, the present disclosure relates to a method of making the anticaking agent of the first aspect. This method involves mixing the coarse mineral with the one or more fine minerals to produce a mineral mixture; and applying the coating to the mineral mixture to produce the anticaking agent.

In one embodiment of the method, the mineral mixture is suspended in a solution, and the method further comprises drying the anticaking agent.

In one embodiment of the method, the applying involves spraying the coating onto the mineral mixture.

In one embodiment of the method, the applying involves silanization of the mineral mixture.

In one embodiment of the method, the coarse mineral has a specific surface area in a range of 3-15 $m^2$/g.

In one embodiment of the method, the coarse mineral has a pore volume in a range of 1.3-2.5 mL/g.

According to a third aspect, the present disclosure relates to a fertilizer mixture having reduced caking. The fertilizer mixture comprises 98.0-99.9 wt % of a hygroscopic fertilizer, and 0.1-2.0 wt % of the anticaking agent of the first aspect, each relative to a total weight of the fertilizer mixture. The fertilizer mixture is in the form of granules having an average particle size in a range of 0.5-7.5 mm.

In one embodiment, the hygroscopic fertilizer comprises urea.

In one embodiment, the fertilizer mixture has a reduced caking when exposed to a relative humidity of 70-90% in air at a temperature of 25-30° C. for 5-14 days, when compared to a substantially similar hygroscopic fertilizer exposed to similar conditions without the anticaking agent.

In one embodiment, the fertilizer mixture has a reduced caking when exposed to a relative humidity of 70-90% in air at a temperature of 25-30° C. for 5-14 days, when compared to a substantially similar fertilizer mixture that lacks the coarse mineral.

In one embodiment, the fertilizer mixture has a reduced caking when exposed to a relative humidity of 70-90% in air at a temperature of 25-30° C. for 5-14 days, when compared to a substantially similar fertilizer mixture that has no fine mineral.

According to a fourth aspect, the present disclosure relates to a method of making the fertilizer mixture of the third aspect. This method involves mixing the hygroscopic fertilizer and the anticaking agent for 5-20 minutes.

In one embodiment, the hygroscopic fertilizer has an average particle diameter in a range of 2-6 mm.

In one embodiment, the hygroscopic fertilizer and the anticaking agent are mixed with a rotary drum.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A is a cross-section view of an anticaking agent having embedded domains of coarse and/or fine minerals.

FIG. 1B is another cross-section view of an anticaking agent having embedded domains of coarse and/or fine minerals.

FIG. 2A is a cross-section view of a granule of a fertilizer mixture having a core-shell structure.

FIG. 2B is a cross-section view of another granule of a fertilizer mixture having a core-shell structure.

FIG. 3 is a table showing the compositions of different anticaking agents, with their anticaking abilities ranked on a scale of poor anticaking (*) to very good anticaking (*****).

FIG. 4B shows a table of the data for the graph in FIG. 4A.

FIG. 10 is a table showing the relevant mixtures and Qualitative assessment scores of anticaking ability and compatibilizer ability.

DETAILED DESCRIPTION OF THE EMBODIMENTS

Figure 4A:
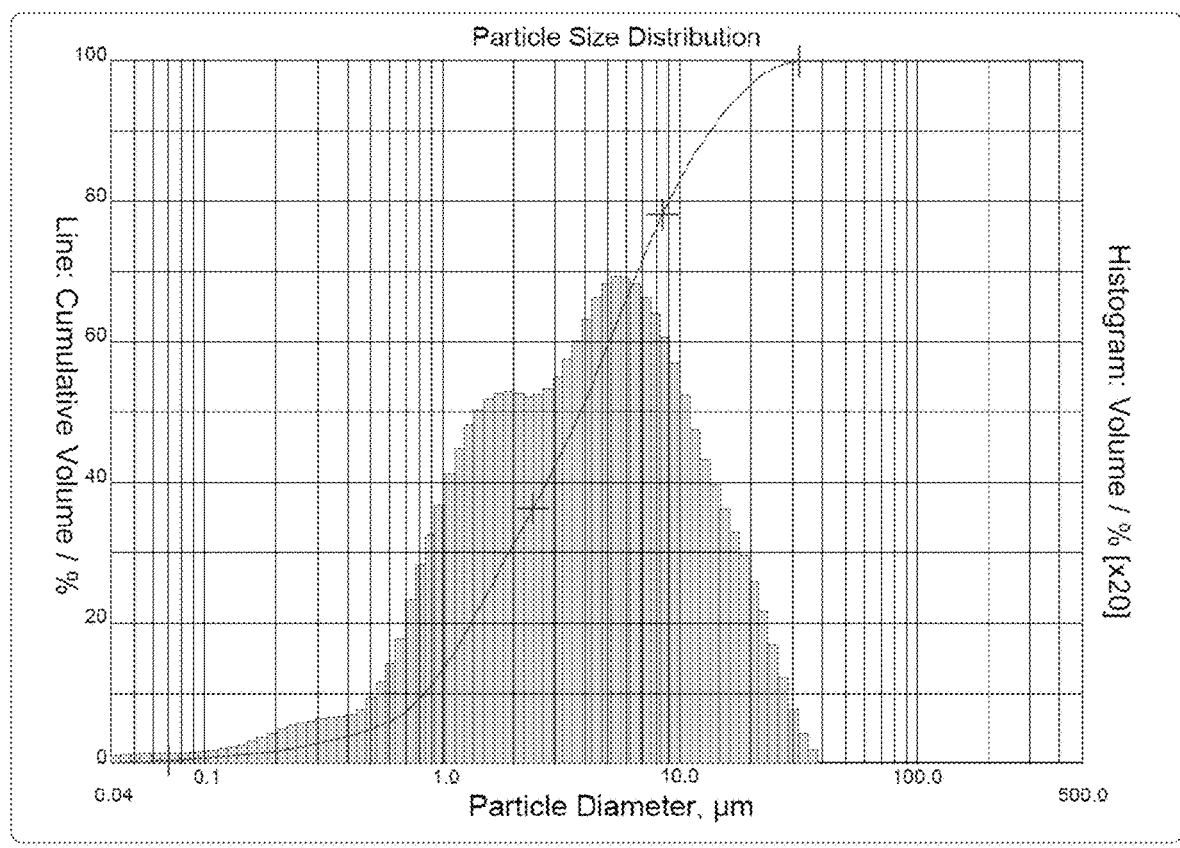
FIG. 4A is particle size distribution graph of an anticaking agent.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

A structure described as "amorphous" herein refers to no short or long chain order and a crystalline structure refers to at least some level of order. Materials that may be described as semi-crystalline may therefore be considered crystalline in the present disclosure. The products herein are typically not 100% crystalline or 100% amorphous or non-crystalline, but rather exist on a spectrum between these points. In some embodiments, a compound may be predominantly amorphous or a combination of an amorphous phase and a crystalline phase.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of silicon include $^{28}Si$, $^{29}Si$, and $^{33}Si$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to an anticaking agent made of 20-80 wt %, preferably 30-70 wt %, coarse mineral, 20-80 wt %, preferably 30-70 wt % one or more fine minerals, and 1-30 wt %, preferably 1-20 wt % coating, each weight percentage relative to a total weight of the anticaking agent. However, in other embodiments, the anticaking agent may comprise less than 20 wt % or more than 80 wt % coarse or fine mineral, or less than 1 wt % or greater than 30 wt % coating.

In an alternative embodiment, the anticaking agent may consist of only one selected from the group of coating, fine mineral, and coarse mineral. In another alternative embodiment, the anticaking agent may consist of only two selected from the group consisting of coating, fine mineral, and coarse mineral. In another alternative embodiment, the anticaking agent may comprise coating and one or more fine minerals, but no coarse minerals. In one embodiment, the coarse mineral comprises a different mineral than the one or more fine minerals.

In one embodiment, the anticaking agent consists of only one or more fine minerals, a coarse mineral, and a coating. In a further embodiment, the fine mineral consists of one or two chemical formulas or species, and the coarse mineral consists of one chemical formula or species. However, in some embodiments, the fine mineral may comprise a mixture of three or more minerals, and/or the coarse mineral may comprise a mixture of two or more minerals.

The anticaking agent may have a median particle diameter in a range of 2-50 µm, preferably 3-40 µm, more preferably 3.5-20 µm, even more preferably 4-12 µm. However, in some embodiments, the anticaking agent may have a median particle diameter of less than 2 µm or greater than 50 µm. In one embodiment, the coarse and fine minerals form a mineral matrix that is held together by the coating.

In one embodiment, the coarse or fine mineral may comprise perlite. Perlite is a volcanic silica glass containing entrapped water which, when subjected to heat in the expanding process, causes the silica walls of the perlite ore to soften while the entrapped water expands, creating a multitude of cells or voids which increase the size of the particle significantly. This perlite ore expands four to twenty times its original volume to produce "expanded perlite." Expanded perlite can be classified into four distinct types: shattered fragment perlite; individual spherical cell perlite; open-surfaced, expanded perlite; and smooth-surfaced, expanded perlite. The first three types represent prior art perlite and the fourth constitutes the expanded perlite of our invention.

Shattered fragment perlite consists of minute solid particles of perlite comprised primarily of fragments of broken cell wall, which have a specific gravity of about 2.3 and sink in water. These shattered fragments are generated in the process of expanding the perlite ore wherein the perlite ore is overheated, causing the cell walls to burst, forming broken or shattered solid pieces.

Individual spherical cell perlite is perlite that has a single, hollow, spherical cell with a thin, glassy wall. This material is generally quite small in size and is a product of either the expansion of extremely fine particles of perlite ore or the degradation of the larger open-surfaced cell, expanded perlite. It is characterized as being hollow glass microspheres. It is relatively expensive because the expanded perlite has to be screened through sieves in order to obtain this product.

Open-surfaced, expanded perlite is an expanded perlite with a vesicular structure consisting of numerous polygonal cells with internal cells that are closed or sealed and external surface cells that are open. This type of expanded particle ranges in size from 50 to 10 mesh, but is generally 30-mesh or larger. This open-surfaced perlite tends to be angular in shape and quite friable. The fragmented external cell walls of this type of perlite are referred to in the industry as "rabbit ears." Rabbit ears tend to break off from the larger perlite pieces and form shattered fragment perlite. The open-surfaced, expanded perlite particles have a bulk density of 32 to 112 kg/m$^3$. These particles float in water, but they are not as buoyant as smooth-surfaced, expanded bubble perlite because of their open surface cells.

Smooth-surfaced, vesicular, expanded perlite is an expanded perlite consisting of numerous polygonal cells with both the internal and external surface cells, for the most part, being closed. The cell walls of the perlite are relatively thick compared to the size of the interior voids. This smooth-surfaced perlite is rounded and generally spherical in shape. This perlite floats on water and is more buoyant than open-surfaced, expanded perlite because of its rounded shape, and because its surface is smooth and, for the most part, closed. It does not have rabbit ears, is relatively non-friable, and it imparts significant structural characteristics to mixtures with other compounds. This type of expanded perlite may be from 100 to 30 mesh in size with a bulk density of from 48 to 320 kg/m$^3$, preferably 128 to 240 kg/m$^3$. At least about 90% by weight is retained on a 100 mesh screen. This perlite may have a silicon dioxide content of over 70%.

In one embodiment, the coarse and/or fine mineral may comprise diatomaceous earth (DE). In a related embodiment, the coarse and/or fine mineral may comprise a natural amorphous silica product derived from diatomaceous earth, or as described in U.S. Pat. No. 9,834,684—incorporated herein by reference in its entirety.

Diatomaceous earth is, in general, a sedimentary biogenic silica deposit comprising the fossilized skeletons of diatoms, one-celled algae-like plants that accumulate in marine or fresh water environments. Porous silica structures generally give diatomaceous earth one or more useful characteristics, such as absorptive capacity, high surface area, chemical stability, and low bulk density.

In a preferred embodiment, the coarse mineral is diatomaceous earth. In an alternative embodiment, the coarse mineral may be silica that is not from diatomaceous earth. In this embodiment, the silica may comprise fumed silica, hydrophobic silica, amorphous silica, precipitated silica, α-quartz, β-quartz, α-tridymite, β-tridymite, α-cristobalite, β-cristobalite, some other silica, or any mixture thereof.

In one embodiment, the diatomaceous earth comprises at least 94 wt % silica (SiO$_2$), preferably at least 96 wt % silica, more preferably at least 98 wt % silica, relative to a total weight of the diatomaceous earth. However, in some embodiments, the diatomaceous earth may comprise less than 94 wt % silica.

In one embodiment, the diatomaceous earth comprises less than 1 wt % crystalline silica, preferably less than 0.8 wt % crystalline silica, even more preferably less than 0.6 wt % crystalline silica, relative to a total weight of the diatomaceous earth. The crystalline silica may be quartz and/or cristobalite.

In one embodiment, the diatomaceous earth can comprise an uncalcined diatomaceous earth. In another embodiment, the diatomaceous earth can comprise a calcined diatomaceous earth. In yet another embodiment, the diatomaceous earth can comprise a flux calcined diatomaceous earth.

In one embodiment, the coarse or fine mineral may comprise talc. Talc may also be known as hydrated magnesium silicate and may be known by the chemical formula $H_2Mg_3(SiO_3)_4$ or $Mg_3Si_4O_{10}(OH)_2$. Talc is a metamorphic mineral that results from the metamorphism of magnesium minerals such as serpentine, pyroxene, amphibole, and olivine, in the presence of carbon dioxide and water.

In one embodiment, the talc may be part of a mixture, such as the talc/kaolin mixture ITATALC 635 from Imerys Filtration Minerals, Inc., San Jose, Calif. In another embodiment, the talc may be ITATALC 200A or LUZENAC A3.

In one embodiment, the coarse or fine mineral may comprise calcium carbonate. The calcium carbonate may be from natural calcium carbonate or from natural calcium carbonate-containing minerals (marble, limestone, chalk, dolomite, shells, etc.) or ground calcium carbonate (natural calcium carbonate which has been ground). Alternatively, the calcium carbonate may be precipitated calcium carbonate (PCC), which is a synthetically manufactured calcium carbonate material that can be tailor-made with respect to its compositional forms, purity, morphology, particle size, and other characteristics (e.g. particle size distribution, surface area, cubicity, etc.) using various precipitation techniques and methods.

Calcium carbonate exists in different phases and morphologies, for example, vaterite, calcite, and aragonite. Calcium carbonate may also be amorphous, or exist as a combination of more than one phase. Vaterite is a metastable phase of calcium carbonate at ambient conditions at the surface of the earth and belongs to the hexagonal crystal system. Vaterite is less stable than either calcite or aragonite, and has a higher solubility than either of these phases. Therefore, once vaterite is exposed to water, it may convert to calcite (for example, at low temperature) or aragonite (for example, at high temperature: ~60° C.). There are other pathways and methods for conversion of one to the other as well, and the above are presented merely as examples. The vaterite form is uncommon because it is generally thermodynamically unstable.

The calcite form is the most stable form and the most abundant in nature and may have one or more of several different shapes, for example, rhombic and scalenohedral shapes. The rhombic shape is the most common and may be characterized by crystals having approximately equal lengths and diameters, which may be aggregated or unaggregated. Calcite crystals are commonly trigonal-rhombohedral. Scalenohedral crystals are similar to double, two-pointed pyramids and are generally aggregated.

The aragonite form is metastable under ambient temperature and pressure, but can be converted to calcite, for example, at elevated temperatures and pressures. The aragonite crystalline form may be characterized by acicular, needle- or spindle-shaped crystals, which can be aggregated and which typically exhibit high length-to-width or aspect ratios. For instance, aragonite may have an aspect ratio ranging from about 3:1 to about 15:1. Aragonite may be produced, for example, by the reaction of carbon dioxide with slaked lime. In one embodiment, the calcium carbonate may be BARRALIM PLUS.

In one embodiment, the coarse or fine mineral may comprise kaolin or calcined kaolin. The kaolin may also be known as kaolinite, and includes calcined kaolin. In one embodiment, the kaolin is limited to calcined kaolin. In one embodiment, the kaolin may be the calcined kaolin ALPHA-TEX HP KAOLIN from Imerys Filtration Minerals, Inc., San Jose, Calif. The kaolin may be some other kaolin such as SACA B, SACA C, SACA C1, SACA P, and SACA SFC, or some other calcined kaolin clay such as SAC 200ZA, or ITASIL 2115G. In one embodiment, the kaolin may be part of a mixture, such as the talc/kaolin mixture ITATALC 635 from Imerys Filtration Minerals, Inc., San Jose, Calif. In other embodiments, the kaolin may be considered a metakaolin. In other embodiments, a mixture of calcined and non-calcined kaolin may be used.

In an alternative embodiment, the coarse or fine mineral may be a zeolite, a pozzolan, a layered double hydroxide, zinc oxide, sodium bicarbonate, titanium dioxide, feldspar, fly ash, cement, lignosulfonate, magnesium nitrate, calcium oxide, bentonite, dolomite, spinel oxide, clay, belite (2CaO-.SiO$_2$), alite (3CaO.SiO$_2$), celite (3CaO.Al$_2$O$_3$), or brownmillerite (4CaO.Al$_2$O$_3$.Fe$_2$O$_3$), a silica, or some other mineral. In one embodiment, the coarse or fine mineral may be one selected from a commercial preparation, including, but not limited to, LUZENAC A3, BARRALIM PLUS, KAOLIN NP, ITASIL 2115G, ITASILEX 3100, ITATALC 200A, ITATALC 635A, SAC 200ZA, SACA B, SACA C, SACA C1, SACA P, and SACA SFC.

Where the coarse and/or fine mineral is a cement, the cement may include type I, Type Ia, type II, type IIa, type III, type IIIa, type IV and type V Portland cements (using either the ASTM CI50 standard or the European EN-197 standard), hydraulic cements, non-hydraulic cements, Portland fly ash cement, Portland Pozzolan cement, Portland silica fume cement, masonry Cements, mortars, EMC cements, stuccos, plastic cements, expansive cements, White blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or Pozzolana mortar.

In one embodiment, the anticaking agent may further comprise a pigment, so that its coating ability on a fertilizer can be checked visually, provided that the pigment contrasts with the color of the fertilizer. Suitable pigments are those now known or that may be hereafter discovered. Exemplary pigments include organic pigments and inorganic pigments, including, but are not limited to, carbon black, Nigrosine dyes, black iron oxide, Naphthol Yellow S, HANSA Yellow (10G, 5G and G), Cadmium Yellow, yellow iron oxide, loess, chrome yellow, Titan Yellow, polyazo yellow, Oil Yellow, HANSA Yellow (GR, A, RN and R), Pigment Yellow L, Benzidine Yellow (G and GR), Permanent Yellow (NCG), Vulcan Fast Yellow (5G and R), Tartrazine Lake, Quinoline Yellow Lake, Anthrazane Yellow BGL, isoindolinone yellow, red iron oxide, red lead, orange lead, cadmium red, cadmium mercury red, antimony orange, Permanent Red 4R, Para Red, Fire Red, p-chloro-o-nitroaniline red, LITHOL Fast Scarlet G, Brilliant Fast Scarlet, Brilliant Carmine BS, Permanent Red (F2R, F4R, FRL, FRLL and F4RH), Fast Scarlet VD, Vulcan Fast Rubine B, Brilliant Scarlet G, LITHOL RUBINE GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, Eosin Lake, Rhodamine Lake B, Rhodamine Lake Y, Alizarine Lake, Thioindigo Red B, Thioindigo Maroon, Oil Red, Quinacridone Red, PYRAZOLONE Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone, titanium dioxide, calcium sulfate, other calcium carbonate, satin white, plastic pigments, aluminum hydrate, and mica. In one embodiment, a moisture sensitive dye or pigment may be used in order to signal an amount of absorbed or adsorbed water.

In one embodiment, the fine mineral is talc, kaolin, or calcium carbonate. In a preferred embodiment, the fine mineral is talc and/or kaolin. In one embodiment, the fine mineral consists essentially of talc and/or kaolin, where the fine mineral contains at least 99 wt %, preferably at least 99.5 wt %, more preferably at least 99.9 wt % talc, kaolin (including calcined kaolin), or a mixture of both talc and kaolin, relative to a total weight of the fine mineral.

Particle size distribution may be measured by any appropriate measurement technique now known to the skilled artisan or hereafter discovered. In one embodiment, the method for determining particle size distribution employs laser diffraction. In one such embodiment, the instrument used is a Leeds & Northrup MICROTRAC Model X-100. The instrument is fully automated, and the results are obtained using a volume distribution formatted in geometric progression of 100 channels, generally running for 30 seconds with the filter on. The distribution is characterized using an algorithm to interpret data from the diffraction pattern which assumes the particles have spherical shape characterized by a diameter, d. A median particle diameter is identified by the instrument as $d_{50}$, that is, 50% of the total particle volume is accounted for by particles having a diameter equal to or less than this value. Likewise, a $d_{99}$ measurement indicates that 99% of the total particle volume is accounted for by particles having a diameter equal to or less than the $d_{99}$ value. Similarly, a $d_{10}$ measurement indicates that 10% of the total particle volume is accounted for by particles having a diameter equal to or less than this value.

In one embodiment, the particle size or particle size distribution may be measured by laser diffraction or DLS, CILAS, SEDIGRAPH, MICROTRAC, light microscopy, or some other method.

FIG. 4A shows a particle size distribution histogram for the anticaking agent with the data from the table of FIG. 4B.

In one embodiment, the anticaking agent may have a $d_{50}$ of 1.0-15.0 µm, preferably 2.0-10.0 µm, more preferably 3.0-6.0 µm, even more preferably 3.5-4.0 µm, though in some embodiments, the coarse mineral may have a $d_{50}$ larger than 15 µm, for example, 16-30 µm, 30-100 µm, 200 µm-1 mm, or 800 µm-2 mm.

In one embodiment, the anticaking agent has a $d_{10}$ of 0.1-3.0 µm, preferably 0.2-1.1 µm, though in some embodiments, the anticaking agent may have a $d_{10}$ of less than 0.1 µm or greater than 3 µm, for instance, 3-4 µm, or 4-5 µm.

In one embodiment, the anticaking agent has a $d_{99}$ of 10-50 µm, preferably 18-35 µm, more preferably 20-30 µm, though in some embodiments, the $d_{99}$ may be less than 10 µm or greater than 50 µm, for instance, 60-100 µm, or 100-120 µm.

Referring now to the coarse mineral, in one embodiment, the coarse mineral may have a median particle diameter ($d_{50}$) of 1-20 µm, preferably 2-15 µm, more preferably 3-10 µm, even more preferably 3.1-8 µm, though in some embodiments, the coarse mineral may have a median particle diameter larger than 20 µm, for example, 35-100 µm, 200-400 µm, 500 µm-1 mm, or 800 µm-2 mm.

In one embodiment, the coarse mineral has a $d_{10}$ of 0.5-3 µm, preferably 1-2 µm, though in some embodiments, the coarse mineral may have a $d_{10}$ of less than 0.5 µm or greater than 3 µm, for instance, 3-4 µm, or 4-5 µm.

In one embodiment, the coarse mineral has a $d_{99}$ of 15-100 µm, preferably 18-50 µm, more preferably 20-30 µm, though in some embodiments, the $d_{99}$ may be less than 15 µm or greater than 100 µm, for instance, 101-105 µm, or 105-120 µm.

In one embodiment, the coarse mineral may have a mean or average particle diameter of 4-20 µm, preferably 6-18 µm, more preferably 8-15 µm, though in some embodiments, the coarse mineral may have a mean particle diameter larger than 20 µm, for example, 35-100 µm, 200-400 µm, 500 µm-1 mm, or 800 µm-2 mm.

In one embodiment, the coarse mineral has a volumetric mean diameter of 2-15 µm, preferably 4-12 µm, more preferably 5-10 µm, though in some embodiments, the volumetric mean diameter may be less than 2 µm, or greater than 15 µm, for instance, 15-17 µm or 20-30 µm.

In a preferred embodiment, the coarse mineral has a $d_{10}$ of 1-2 µm, or about 1.56 µm, a $d_{50}$ of 6-7 µm, or about 6.49 µm, a $d_{99}$ of 22-25 µm, or about 23.57 µm, and a volumetric mean diameter of 7-9 µm, or about 7.91 µm. In a further embodiment, the coarse mineral having these particles sizes and particle size distribution a natural amorphous silica product derived from diatomaceous earth a natural amorphous silica product derived from diatomaceous earth.

In one embodiment of the method, the coarse mineral has a specific surface area in a range of 3-15 m$^2$/g, preferably 4-13 m$^2$/g, more preferably 6-10 m$^2$/g. However, in some embodiments, the coarse mineral may have a specific surface area of less than 3 m$^2$/g or greater than 15 m$^2$/g, for instance, 16-18 m$^2$/g, or 18-20 m$^2$/g. Preferably the specific surface area is determined by $N_2$ adsorption-desorption and Brunauer-Emmett-Teller (BET) methods, however, other procedures may be used.

In one embodiment, the coarse mineral has a pore volume in a range of 1.3-2.5 mL/g, preferably 1.5-2.1 mL/g, more preferably 1.6-1.9 mL/g. However, in some embodiments, the pore volume may be less than 1.3 mL/g or greater than 2.5 mL/g.

In one embodiment, the fine mineral may have a median particle diameter ($d_{50}$) of 500 nm-4 µm, preferably 1.0-3.5 µm, more preferably 1.2-3.2 µm. However, in some embodiments, the fine mineral may have a median particle diameter of less than 500 nm, for example, 400-500 nm, 300 nm-400 nm, or 200-300 nm. In some embodiments, the fine mineral may have a median particle diameter of greater than 4 µm, for instance, 5-8 µm, 8-10 µm, or 10-12 µm.

In one embodiment, the fine mineral may have a $d_{10}$ of 0.05-10 µm, preferably 0.5-7 µm, more preferably 0.6-5 µm, or 0.7-0.8 µm, or 3.0-3.5 µm. However, in some embodiments, the fine mineral may have a $d_{10}$ of less than 50 nm, or greater than 10 µm.

In one embodiment, the fine mineral may have a $d_{99}$ of 5-30 µm, preferably 6-25 µm, more preferably 6.5-7.5 µm or 20-25 µm. However, in some embodiments, the fine mineral may have a $d_{99}$ of less than 5 µm, for instance, 3-5 µm or 1-3 µm.

In one embodiment, the fine mineral may have a mean particle diameter of 500 nm-4 µm, preferably 1.0-3.5 µm, more preferably 1.2-3.2 µm. However, in some embodiments, the fine mineral may have a mean particle diameter of less than 500 nm, for example, 400-500 nm, 300 nm-400 nm, or 200-300 nm. In some embodiments, the fine mineral may have a mean particle diameter of greater than 4 µm, for instance, 5-8 µm, 8-10 µm, or 10-12 µm.

In one embodiment, the fine mineral has a volumetric mean diameter of 1-15 µm, preferably 2-10 µm, more preferably 2-3 µm or 8.5-10.5 µm. However, in some embodiments, the fine mineral may have a volumetric mean diameter of less than 1 µm or greater than 15 µm.

In a preferred embodiment, the fine mineral has a $d_{10}$ of 0.4-1 µm, or about 0.75 µm, a $d_{90}$ of 1.0-2.5 µm, or about 1.82 µm, a $d_{99}$ of 5.8-7.8 µm, or about 6.83 µm, and a volumetric mean diameter of 2-3 µm, or about 2.4 µm. In a further embodiment, the fine mineral having these particles sizes and particle size distribution is calcined kaolin or ALPHATEX HP.

In a preferred embodiment, the fine mineral has a $d_{10}$ of 2.5-4 µm, or about 3.26 µm, a $d_{90}$ of 8-10.5 µm, or about 9.49 µm, a $d_{99}$ of 21-23 µm, or about 22.4 µm, and a volumetric mean diameter of 9.0-10.2 µm, or about 9.73 µm. In a further embodiment, the fine mineral having these particles sizes and particle size distribution is a mixture of 45-85 wt % kaolin and 15-45 wt % talc, each relative to a total weigh of the mixture, which mixture may be ITATALC 635A.

In one embodiment, a coarse or fine mineral may be considered single monodisperse, defined here as having a particle size distribution steepness ($d_{30}/d_{70} \times 100$) of greater than 25, greater than 30, or greater than 35. However, in other embodiments, the coarse or fine mineral may have a particle size distribution steepness of less than 25 or less than 20.

In one embodiment, the fine mineral has a specific surface area of 40-70 m$^2$/g, preferably 45-65 m$^2$/g, more preferably 50-60 m$^2$/g, even more preferably 54-58 m$^2$/g. In some embodiments, the fine mineral may have a specific surface area of less than 40 m$^2$/g, for instance, less than 5 m$^2$/g, 5-10 m$^2$/g, 10-20 m$^2$/g, 20-30 m$^2$/g, or 30-40 m$^2$/g. In another embodiment, the fine mineral may have a specific surface area of greater than 70 m$^2$/g, for instance, 70-80 m$^2$/g, 80-90 m$^2$/g, 90-100 m$^2$/g, 100-110 m$^2$/g, or greater than 110 m$^2$/g.

In one embodiment, the fine mineral may have a pore volume in a range of 0.5-2.5 mL/g, preferably 1.0-2.1 mL/g, more preferably 1.6-1.9 mL/g. However, in some embodiments, the pore volume may be less than 0.5 mL/g or greater than 2.5 m L/g.

In one embodiment, the coarse and/or fine mineral may be in the form of particles or granules having a spherical or substantially spherical shape (i.e., where the sides are rounded or well-rounded) with a sponge-like (i.e., porous) appearance. As defined here, having a substantially spherical shape means that the distance from the particle centroid (center of mass) to anywhere on the particle outer surface varies by less than 30%, preferably by less than 20%, more preferably by less than 10% of the average distance.

In some embodiments, a portion of the particles or granules of the coarse or fine mineral may be angular (corners sharp and jagged), angular, sub-angular, or sub-rounded and possess a jagged flake-like morphology.

In one embodiment, the particles or granules are monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, preferably less than 10%, preferably less than 8%, preferably less than 6%, preferably less than 5%. In one embodiment, the particles are monodisperse, having a particle diameter distribution ranging from 80% of the average particle diameter to 120% of the average particle diameter, preferably 85-115%. In another embodiment, the particles are not monodisperse, for instance, they may be considered polydisperse. Here, the coefficient of variation may be greater than 25%, or greater than 37%. In one embodiment, the particles or granules are polydisperse with a particle diameter distribution ranging from 70% of the average particle diameter to 130% of the average particle diameter, preferably ranging from 60-140%, more preferably 50-150%.

In one embodiment, a ratio of the coarse to the fine median particle diameters may be 1.05:1-50:1, preferably 1.5:1-40:1, more preferably 2.0:1-20:1, even more preferably 2.5:1-4.0:1, or about 3.16:1.

In one embodiment, the coarse mineral comprises a different mineral than the fine mineral. In an alternative embodiment, each of two different minerals may be considered a coarse mineral and a fine mineral, yet have substantially similar median particle diameters, or substantially similar average particle diameters. In another alternative embodiment, the coarse mineral may comprise the same mineral as the fine mineral, but have a bimodal distribution of sizes, so that one population has a median particle diameter in a range of 4-20 µm, and another population has a median particle diameter in a range of 500 nm-4 µm.

In one embodiment, the coarse or fine minerals may have shapes similar to needles, rhombic blocks, needle clusters, rhombic block clusters, spheres, or combinations thereof. In one embodiment, the particles sizes of the coarse or fine minerals may be decreased by grinding or milling, or increased by pelletizing or calcining. The grinding or milling may be performed with a mortar and pestle, a burr mill, a blade grinder, sandpaper, a ball mill, a disc mill, a jet mill, a conical mill, a hammer mill, or some other milling or grinding machine. The pelletizing may produce pellets which are defined here as self-sustaining solids that retain at least 25% of the surface area per mass of the starting compound. The pelletizing may be done with a rotary drum pelletizer, a pan pelletizer, or a pellet press, and the coarse or fine mineral may be subjected to pressures of 10-6000 psi, preferably 100-5,000 psi, more preferably 500-3,000 psi. In one embodiment, a coarse or fine mineral may be repeatedly ground or milled and pelletized.

Particle sizes of the coarse or fine minerals may also be selected by different methods of classifying. For instance, the anticaking agent disclosed herein may be prepared by subjecting at least one coarse or fine mineral to at least one classification. One of ordinary skill in the art will recognize that other conventional processing techniques such as screening and comminution may be used as appropriate. In a typical conventional method of preparing the anticaking agent, crude ores of the minerals are crushed to a size that can be further reduced by milling, air classified, and dried in a furnace in air with subsequent air classification to achieve a product with desired particle size distribution. Drying can be before and/or after the classification.

Any classification method now known to one of ordinary skill in the art or discovered hereafter may be used. In one embodiment, at least one air classification is used. In another embodiment, anticaking agent is produced using a commercially available air classifier equipped with at least one high speed classifier wheel. Without wishing to be bound by any particular air classification configuration, air classifiers generally comprise at least one horizontally or vertically mounted high speed classifying wheel and at least one classifying air outlet. The classifying air injected into the machine base flows inwards through the classifying wheel and discharges the fine material, whereas the coarse particles rejected by the classifying wheel leave the classifier through the coarse material outlet. Several parameters, such as for example classifier wheel speed and air flow, may be optimized to achieve desired products. In one embodiment, the fine particle fraction collected in the cyclone is a coarse or fine mineral for use in the anticaking agent, and the coarse fraction collected in the separator is a by-product or waste. In another embodiment, the coarse fraction collected in the separator is a coarse or fine mineral for use in the anticaking agent, and the fine fraction collected in the cyclone is a by-product when ultra-fine particles are removed. Subjecting the at minerals to two or more classifications may, for example, result in coarse or fine minerals having narrow particle size distribution, which may increase the anticaking ability of the anticaking agent.

In one embodiment, an ALPINE 200 ATP air classifier (Hosokawa Micron Powder Systems, Summit, N.J.) is used to classify the coarse and/or fine minerals. Examples of parameters for the ALPINE 200 ATP classifier include, but are not limited to, classifier wheel speed from about 5000 rpm to about 8000 rpm and total air flow pressure from about 100 to about 400 SCFM (Standard Cubic Feet per Minute).

In another embodiment, a MICRO-SIZER MS-5 air classifier (Progressive Industries, Sylacauga, Ala.) is used to classify the coarse and/or fine minerals. Examples of parameters for the MICRO-SIZER MS-5 classifier include, but are not limited to, classifier wheel speed from about 500 rpm to about 4000 rpm and air fan speed from about 3000 rpm to about 5000 rpm.

In a further embodiment, a simple laboratory scale air classifier may be used to classify the coarse and/or fine minerals. In one embodiment, such a classifier may be used advantageously to make small quantities of anticaking agent, such as for research and development. In the fan speed for a laboratory scale classifier may be from about 1000 rpm to about 3500 rpm.

In another embodiment, the coarse and/or fine minerals are classified by sieving of the feed materials through at least one screen, and in possibly several screens having progressively smaller mesh sizes. Wet classification techniques include sedimentation, which separates suspended solid particles from a liquid by gravity settling, and hydrocycloning, which uses centrifugal action to classify particles in a liquid media.

In one embodiment, the coating may comprise silicone oil, silane, stearin, 2115G, heavy paraffin oil (NUJOL), epoxidated soybean oil, castor oil extra pale, hydrogenated castor oil, polydimethylsiloxane (having a viscosity of about 25° C. of about 350 cSt, or about 50 cSt), wax, black wax, or surfactant. Preferably the coating results in a hydrophobic surface.

As hydrophobizing active components there can be used above all organosilicon compounds, polywaxes (middle molecular weight 1500 to 5000, melting point, 90 to 105° C., $C_{100}$ to $C_{300}$), paraffin waxes (middle molecular weight 370 to 460; softening temperature, 50 to 60° C.; $C_{24}$ to $C_{31}$) and saturated fatty acids, especially higher fatty acids, e.g. of 12 to 18 carbon atoms, as for example stearic acid, lauric acid and palmitic acid and other long chain fatty acids. As organic silanes, there may be especially mentioned propyltrialkoxy silane, e.g. propyl trimethoxy silane, propyl triethoxy silane and propyltributoxy silane, polypropylsiloxane and poly methylsiloxane.

The wax component of the coating composition may be a soft or hard microcrystalline wax, a paraffin wax or a soft synthetic wax. The wax component may be either miscible with the amine component to provide a single coating composition or be able to be coated simultaneously or sequentially along with the amine component onto the particulate fertilizer as part of a two part coating composition. Microcrystalline waxes are the product of tank bottoms from crude oils that have been dehydrated, deoiled, and depending on grade, decolored. In comparison to paraffin wax, microcrystalline waxes have higher melting points, a lower percentage of normal alkanes, more iso- and cyclo-alkanes, higher molecular weights, higher flash points and broader melting point endotherms. The hardness of microcrystalline wax can be altered by a number of factors including oil content and the quantity of other additives such as polyethylene. These and other properties of microcrystalline waxes are described in Tuttle, *The Petroleum Waxes in Petroleum Products Handbook* and Unmuth, *Petroleum Waxes—Their Composition and Physical Properties*, CSMA Convention, Chicago, May 1975. The entire contents of these references are incorporated herein by reference.

Synthetic waxes are paraffins that are produced by the Fischer-Tropsch reaction where coal is burned in gas generators in the presence of oxygen to yield CO and $H_2$. The gas stream is then converted to hydrocarbons over an iron catalyst and the resulting products refined to various synthetic-paraffin grades of wax. The synthetics have very narrow ranges of physical properties. Petroleum waxes generally have hydrocarbons in the $C_{18}$-$C_{70}$ range. Microcrystalline waxes, on the other hand, have hydrocarbons in the $C_{36}$-$C_{70}$ range with small to very small needle-like crystals. Paraffin waxes have hydrocarbons in the $C_{18}$-$C_{56}$ range with plate-like crystals.

Preferred microcrystalline waxes may melt at a temperature of about 60° C. to about 100° C., have a ATSM needle penetration value of about 3 to 60 at 25° C. and are composed of 80 to 95% normal alkanes and 20 to 5% non-normal alkanes. Mixtures of microcrystalline waxes may also be used. More preferred microcrystalline waxes melt at a temperature of 74 to 96° C., a ATSM needle penetration of about 3 to 35 at 25° C. and are composed of 85 to 93% normal alkanes and 15 to 7% non-normal alkanes. Commercially available microcrystalline waxes that meet these criteria are Be Square 195 Amber, FR 5315, Victory Lite microcrystalline wax, C1035 microcrystalline wax, and SP200 soft synthetic wax, all available from Bareco Products of Rock Hill, S.C. The waxes may be chosen from macrocrystalline waxes or mixtures of microcrystalline and macrocrystalline waxes. Other waxes include but are not limited to beeswax, carnauba wax, jojoba wax. Given that waxes are characterized by their melting point, the wax or the mixture of waxes used in the compositions in accordance with the invention has a melting point which may be between 45 and 100° C., preferably from 48 to 80° C.

Mineral oils to be used in the coating are preferably chosen from those of paraffinic or naphthenic nature whose viscosity at 40° C. is between 15 and 800 mm$^2$/s and preferably between 20 and 150 mm$^2$/s. Other oils include but are not limited to *Cocos nucifera* oil, palm oil, and *Butyrospermum parkii* (shea) butter.

Other compounds that may be added to the coating, or mixed in the coating similar to the coarse and fine minerals include tricalcium phosphate, powdered cellulose, magnesium stearate, magnesium carbonate, sodium bicarbonate, sodium ferrocyanide, potassium ferrocyanide, calcium ferrocyanide, bone phosphate (i.e. Calcium phosphate), sodium silicate, silicon dioxide, calcium silicate, magnesium trisilicate, sodium aluminosilicate, potassium aluminium silicate, calcium aluminosilicate, bentonite, aluminium silicate, stearic acid, calcium citrate, tannin resin, and hydroxyapatite.

In one embodiment, the coating comprises a silane, which is reacted with the surface of the coarse and/or fine mineral. In other words, the coarse and/or fine mineral (the mineral mixture) is surface treated with a silane, or "silanized." In one embodiment the surface treatment silanizes the coarse and/or fine mineral, wherein the surface treating agent is at least one siloxane. In general, siloxanes are any of a class of organic or inorganic chemical compounds comprising silicon, oxygen, and often carbon and hydrogen, based on the general empirical formula of $R_2SiO$, where R may be an alkyl group. Exemplary siloxanes include, but are not limited to, dimethylsiloxane, methylphenylsiloxane, methylhydrogen siloxane, methyltrimethoxysilane, octamethylcyclotetrasiloxane, hexamethyldisiloxane, diphenylsiloxane, and copolymers or blends of copolymers of any combination of monophenylsiloxane units, diphenylsiloxane units, phenylmethylsiloxane units, dimethylsiloxane units, monomethylsiloxane units, vinylsiloxane units, phenylvinylsiloxane units, methylvinylsiloxane units, ethylsiloxane units, phenylethylsiloxane units, ethylmethylsiloxane units, ethylvinylsiloxane units, or diethylsiloxane units.

In one embodiment, the at least one surface treatment silanizes the coarse and/or fine mineral, wherein the at least one surface treating agent is at least one silane. In general, silanes and other monomeric silicon compounds have the ability to bond inorganic materials, such as the embodiment, the, to organic resins and materials, such as at least one active ingredient. The bonding mechanism may be due largely to two groups in the silane structure: the Si(OR$_3$) portion interacts with the coarse and/or fine mineral, while the organofunctional (vinyl-, amino-, epoxy-, etc.) group interacts with the at least one active ingredient.

In one embodiment, the coarse and/or fine mineral is subjected to at least one surface treatment with at least one ionic silane. Exemplary ionic silanes include, but are not limited to, 3-(trimethoxysilyl)propyl-ethylenediamine triacetic acid trisodium salt and 3-(trihydroxysilyl)propylmethylphosphonate salt. In another embodiment, the carrier material is subjected to at least one surface treatment with at least one nonionic silane. In a further embodiment, the carrier material is subjected to at least one surface treatment with at least one silane of Formula (I):

$$(R^1)_xSi(R^2)_{3-x}R^3 \qquad (I)$$

wherein: R$^1$ is any hydrolysable moiety that may chemically react with any active group on the surface of the coarse and/or fine mineral, such as but not limited to alkoxy, halogen, hydroxy, aryloxy, amino, amide, methacrylate, mercapto, carbonyl, urethane, pyrrole, carboxy, cyano, aminoacyl, or acylamino, alkyl ester, and aryl ester; "x" has a value between 1 and 3, such that more than one siloxane bond may be formed between the coarse and/or fine mineral and the at least one silane; R$^2$ is any carbon-bearing moiety that does not substantially react or interact with the coarse and/or fine mineral during the treatment process, such as but not limited to substituted or unsubstituted alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, and arylalkaryl; R$^3$ is any organic containing moiety that remains substantially chemically attached to the silicon atom of Formula (I) once the at least one surface treatment is completed and that is capable or reacting or interacting with the at least one active ingredient, such as but not limited to hydrogen, alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, arylalkaryl, alkoxy, halogen, hydroxy, aryloxy, amino, amide, methacrylate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium; wherein the hydrogen of said alkyl, alkenyl, aryl, cycloalky, cycloalkenyl, heteroaryl, and heterocyclic is optionally substituted by, for example, halogen, hydroxy, amino, carboxy, or cyano.

In another embodiment, the coarse and/or fine mineral has a hydroxyl-bearing porous surface which is subjected to at least one surface treatment with at least one silane, such that the material surface is covalently bonded to the at least one silane. In such an embodiment, the surface area of the coarse and/or fine mineral may limit the amount of the bound silane and, as a result, it may be preferable to subject the carrier material to at least one physical surface treatment that increases the surface area of the carrier material prior to treatment with the at least one silane.

In a further embodiment, the coarse and/or fine mineral is subjected to at least one surface treatment with at least one silane having one or more moieties selected from the group consisting of alkoxy, quaternary ammonium, aryl, epoxy, amino, urea, methacrylate, imidazole, carboxy, carbonyl, isocyano, isothiorium, ether, phosphonate, sulfonate, urethane, ureido, sulfhydryl, carboxylate, amide, pyrrole, and ionic.

Exemplary silanes having an alkoxy moiety include, but are not limited to, are mono-, di-, or trialkoxysilanes, such as n-octadecyltriethoxysilane, n-octytriethoxysilane, phenyltriethoxysilane, octyltriethoxysilane, and vinyltrimethoxysilane.

Exemplary silanes having a quaternary ammonium moiety include, but are not limited to, quaternary ammonium salts of a substituted silanes, 3-(trimethoxysilyl) propyloctadecyldimethylammonium chloride, poly-(diallyldimethylammonium chloride), N-trimethoxysilylpropyl-N,N,N-trimethylammonium chloride, octadecylaminodimethyl trimethoxysilylpropyl ammonium chloride, and 3-(N-styrylmethyl-2-aminoethylamino)-propyltrimethoxysilane hydrochloride.

Exemplary silanes having an aryl moiety include, but are not limited to, 3-(trimethoxysilyl)-2-(p,m-chloromethyl)-phenylethane, 2-hydroxy-4-(3-triethoxysilyl propoxy)-diphenylketone, ((chloromethyl)phenylethyl)trimethoxysilane and phenyldimethylethoxysilane.

Exemplary silanes having an epoxy moiety include, but are not limited to, 3-glycidoxypropyltrimethoxysilane and 2-(3,4-epoxycyclohexyl) ethyltrimethoxysilane.

Exemplary silanes having an amino moiety include, but are not limited to, 3-aminopropyltrimethoxysilane, N-(2-aminoethyl)-3-aminopropyltrimethoxysilane, trimethoxysilylpropyldiethylenetriamine, 2-(trimethoxysilylethyl) pyridine, N-(3-trimethoxysilylpropyl)pyrrole, trimethoxysilylpropyl polyethyleneimine, bis-(2-hydroxyethyl)-3-aminopropyltriethoxysilane, and bis(2-hydroxyethyl)-3-amino propyltriethoxysilane.

Exemplary silanes having a urea moiety include, but are not limited to, N-(triethoxysilyl propyl) urea and N-1-phenylethyl-N'-triethoxysilylpropylurea.

A nonlimiting example of a silane having a methacrylate moiety is 3-(trimethoxysilyl) propyl methacrylate.

Exemplary silanes having an imidazole moiety include, but are not limited to, N-[3-(triethoxysilyl)propyl]imidazole and N-(3-triethoxysilyl propyl)-4,5-dihydroimidazole.

A nonlimiting example of a silane having a carbonyl moiety is 3-(triethoxysilyl)propylsuccinate.

Exemplary silanes with an isocyano moiety include, but are not limited to, tris(3-trimethoxysilylpropyl)isocyanurate and 3-isocyanatopropyltriethoxysilane.

A nonlimiting example of a silane having an isothiourium moiety is the salt of trimethoxysilylpropylisothiouronium, such as the chloride salt.

Exemplary silanes having an ether moiety include, but are not limited to, bis[(3-methyldimethoxysilyl)propyl]-polypropylene oxide and N-(triethoxysilylpropyl)-O-polyethylene oxide urethane.

A nonlimiting example of a silane having a sulfonate moiety is 2-(4-chlorosulfonylphenyl)-ethyltrichlorosilane.

Exemplary silanes having a urethane moiety include, but are not limited to, N-(triethoxysilyl propyl)-O-polyethylene oxide urethane and O-(propargyloxy)-N-(triethoxysilylpropyl) urethane.

A nonlimiting example of a silane having a sulfhydryl moiety is 3-mercaptopropyltriethoxysilane.

Exemplary silanes having an amide moiety include, but are not limited to, triethoxysilylpropylethyl-carbamate, N-(3-triethoxysilylpropyl)-gluconamide, N-(triethoxysilylpropyl)-4-hydroxybutyramide.

In yet another embodiment, the coarse and/or fine mineral is subjected to surface treatment with a combination of silanes, such as but not limited to: N-trimethoxysilylpropyl-N, N,N-trimethylammonium chloride and bis(2-hydroxyethyl)-3-aminopropyltriethoxysilane; 3-aminopropyltrimethoxysilane and N-(triethoxysilylpropyl)-O-polyethylene oxide urethane; 3-trihydrosilylpropyhnethylphosphonate, sodium salt, and N-(triethoxysilylpropyl)-O-polyethylene oxide urethane; N-trimethoxysilylpropyl-N,N,N—Cl, trimethylammonium chloride and (3-glycidoxypropyl) trimethoxysilane; 3-trihydrosilylpropylmethylphosphonate, sodium salt and bis-(2-hydroxyethyl)-3-aminopropyltriethoxysilane; 3-(N-styrylmethyl-2-aminoethylamino)-propyltrimethoxysilane hydrochloride and N-(triethoxysilylpropyl)-O-polyethylene urethane; 2-(trimethoxysilylethyl) pyridine and N-(3-triethoxysilylpropyl)-gluconamide; trimethoxysilylpropyl-N,N,N—Cl, trimethylammonium chloride and N-(3-triethoxysilylpropyl)-gluconamide; N-trimethoxysilylpropyl-N,N,N—Cl, trimethylammonium chloride and 2-hydroxy-4-(3-triethoxysilylpropoxy)-di phenyl ketone; mercaptopropyltriethoxysilane and N-(triethoxysilylpropyl)-O-polyethylene oxide urethane; 3-(triethoxysilyl)propylsuccinic and N-(triethoxysilylpropyl)-O-polyethylene urethane, trimethoxysilylpropyl-ethylenediamine, triacetic acid, trisodium salt and N-(triethoxysilylpropyl)-O-polyethylene oxide urethane; 2-(4-chlorosulfonylphenyl)-ethyltrichlorosilane and N-(triethoxysilylpropyl)-O-polyethylene oxide urethane; and 2-(4-chlorosulfonylphenyl)-ethyltrichlorosilane and bis-(2-hydroxyethyl)-3-aminopropyltriethoxysilane. In one embodiment, the coarse and/or fine mineral may be silanized with a mixture of octyltriethoxysilane and vinyltrimethoxysilane. Octyltriethoxysilane and vinyltrimethoxysilane may be known by the trade names SILQUEST A-137 and SILQUEST A-171, respectively, from Momentive Performance Materials Inc., Waterford, N.Y. A molar ratio of octyltriethoxysilane to vinyltrimethoxysilane in the mixture may be 1:10-10:1, preferably 1:5-5:1, more preferably 1:2-2:1.

According to a second aspect, the present disclosure relates to a method of making the anticaking agent. This method involves mixing the coarse and fine minerals to produce a mineral mixture; and then applying the coating to the mineral mixture to produce the anticaking agent. Here, "applying the coating" includes reacting the coating or a coating compound to the coarse mineral and/or fine mineral, meaning that ionic or covalent bonding occurs between the coating and the mineral. "Applying the coating" also includes adsorbing the coating or a coating compound onto the coarse mineral and/or fine mineral. In some embodiments, the coating may be both adsorbed and reacted to a mineral mixture of the coarse and/or fine minerals.

In some embodiments, a surface treatment process may proceed according to "wet" or "dry" processes well-known to those having skill in the art. For example, a "wet" process generally comprises reacting or applying a coating component onto the coarse and/or fine mineral in at least one solvent (e.g., organic solvent or water).

In one embodiment, heat is used in place of or in addition to the at least one solvent. Heat or solvent is not required for the "wet" process, but it may improve the reaction rate and the uniform surface coverage. In another embodiment, a "wet" process includes in-line mixing of slurries or liquids during typical surface treatment processing steps, including but not limited to filtration and drying.

In one embodiment, a "dry" process generally comprises reacting or applying the coating onto the coarse and/or fine mineral in a vapor phase by mixing the coating compound with the coarse and/or fine mineral and then heating the mixture. In another embodiment, a "dry" process comprises reacting or applying the coating compound with the coarse and/or fine mineral in a stirred liquid phase by mixing the coating compound with the coarse and/or fine mineral and then heating the mixture. In one embodiment, a "dry" process comprises mixing the coating compound with the coarse and/or fine mineral and incubating in a sealed container at elevated temperatures to speed up the surface treatment process. In yet another embodiment, the "dry" process includes mixing of dry powdered coarse and/or fine mineral and a liquid coating, where the amount of liquid coating added is small enough that the reaction mass remains solid-like and can continue to be processed like a dry powder. In this instance, applying the coating may be done by spraying the coating onto the coarse and/or fine mineral (mineral mixture).

In one embodiment, the coarse and/or fine mineral is subjected to at least one surface treatment with a coating compound by adding the coating compound gradually to a rapidly stirred solvent, which is in direct contact with the coarse and/or fine mineral. In another embodiment, the coarse and/or fine mineral is subject to at least one surface treatment with at least coating compound by carrying out the treatment in a vapor phase, which causes the vapor of the coating compound to contact and react with the coarse and/or fine mineral.

In another embodiment, the coarse and/or fine mineral is placed in a vacuum reactor and dried under vacuum. The coating compound may then be added to the vacuum chamber as a vapor and may contact the coarse and/or fine mineral. After a certain contact time, byproducts of the reaction, or unadsorbed coating compound, may be removed under reduced pressure. When the vacuum is released, the surface treated mineral matrix, or the anticaking agent) may be removed from the chamber. The actual treatment process may be carried out in a period from about 1 minute to about 24 hours. The treatments may be carried out at temperatures ranging from about 0° C. to about 400° C.

The amount of the coating compound used in the surface treatment may depend on various factors, including but not limited to the amount of the coarse and/or fine mineral to be surface treated, the number of hydroxyl groups on the surface of the coarse and/or fine mineral to be reacted, and the molecular weight of the coating compound. In one embodiment, a stoichiometric amount equivalent to the available surface hydroxyls or other functional groups, plus some excess amount of the coating compound is used for the surface treatment, in an effort to reduce the number of potential side reactions. In another embodiment, a greater than a stoichiometric amount of the coating compound is used to create a thicker or denser coating layer. In one embodiment, about 0 to about 500 times stoichiometric excess is used. In another embodiment, about 5 to about 100 times stoichiometric excess is used. In a further embodiment, about 10 to about 50 times stoichiometric excess is used. In yet another embodiment, about 10 to about 20 times stoichiometric excess is used.

In some embodiments, in the case of silanization, a silane with at least one hydrolysable group may condense with at least one hydroxyl group on the surface of the coarse and/or fine mineral and provide covalent coupling of organic groups to those substrates. In one embodiment, at least one alkoxy group of the silane chemically reacts with at least one hydroxyl group on the surface of the coarse and/or fine mineral. In another embodiment, a silane having at least one quaternary ammonium moiety is used and the protonated, positive charge of those silanes electrostatically attracts to a deprotonated group of the coarse and/or fine mineral to facilitate fast and efficient reaction.

In one embodiment, the coarse and/or fine mineral may be surface treated with silicone oil, by a "wet" process, a "dry" process, or by some other method as described above. The silicone oil may also be known as silicone fluid or silicone. In a further embodiment, the silicone oil may be polydimethylsiloxane (PDMS), which is also known as dimethicone (DMS). In one embodiment, the silicone is DMS 350, for instance, XIAMETER PMX-200 Silicone Fluid from Dow Chemical, Midland, Mich. In one embodiment, the silicone oil may have a viscosity at 23-27° C. of 20-4,000 centistokes (cSt), preferably 50-2,000 cSt, more preferably 100-500 cSt, even more preferably 250-450 cSt, 300-400 cSt, 320-380 cSt, or about 350 cSt.

In another embodiment, a surface treatment by a coating component, for instance, silicone oil, NUJOL oil, castor oil, hydrogenated castor oil, epoxidated soybean oil, wax, stearin, surfactant, or black wax, may not involve a chemical reaction to the surface of the coarse and/or fine mineral, but contacting the surface with the coating component to allow adsorption. In some instances, this surface treatment by adsorption may involve heating above room temperature, for instance, to 30-35° C., 35-40° C., 40-45° C., or 45-50° C., in order to melt a wax or hydrogenated oil so that it more evenly coats the coarse and/or fine mineral.

In one embodiment, the coarse and/or fine mineral may be surface treated with a mixture of one or more silanes and silicone oils. Or, in other words, the coating may comprise both one or more types of silane and silicone oil. The coating may have a silicone oil to silane mass ratio of 1:5-10:1, preferably 1:1-5:1, more preferably about 2:1. In a further embodiment, the coating may comprise a mixture of polydimethylsiloxane with octyltriethoxysilane and vinyltrimethoxysilane. In one embodiment, the coating may consist essentially of polydimethylsiloxane, silane, or both, meaning that the coating contains at least 99 wt %, preferably at least 99.5 wt %, more preferably at least 99.9 wt % silicone oil, silane, or a mixture of both, relative to a total weight of the coating.

In one embodiment, a fibrous base material may be added to the coating to enhance stability and/or adsorption in the anticaking agent. Thus, the anticaking agent may further comprise a fibrous base material. The fibrous base material is preferably one or more selected from the group consisting of a cellulosic fiber, an organic synthetic fiber, and a mixture of a cellulosic fiber and an organic synthetic fiber. Examples of the cellulosic fiber include natural fibers such as fluff pulp and cellulosic chemical fibers such as viscose rayon, acetate rayon, and cuprammonium rayon. Such cellulosic natural fibers are not particularly limited with respect to their raw material (needle-leaf trees, broadleaf trees, etc.), production method (chemical pulp, semichemical pulp, mechanical pulp, CTMP, etc.), bleaching method, etc. Examples of the organic synthetic fiber include polypropylene fiber, polyethylene fiber, polyamide fiber, polyacrylonitrile fiber, polyester fiber, polyvinyl alcohol fiber, polyurethane fiber, and heat-weldable composite fiber (e.g., fiber in which at least two of said fibers differing in melting point are hybridized in a sheath-core type, an eccentric type, a parallel type, fiber in which at least two of said fibers are blended, and fiber in which the surface layer of said fibers is modified, etc.). Preferred among these fibrous base materials are cellulosic natural fiber, polypropylene fiber, polyethylene fiber, polyester fiber, heat-weldable composite fiber, and mixed fiber thereof, and fluff pulp, heat-weldable composite fiber, and mixtures thereof. In one embodiment, a fibrous base material may be able to absorb moisture and further limit fertilizer caking. A fibrous base material may be present at 1-20 wt %, preferably 2-15 wt % relative to a total weight of the coating, though in some embodiments, the fibrous base material may be present at a weight percentage of lower than 1 wt % or greater than 20 wt %. In other embodiments, the coating may comprise a biodegradable polymer, such as poly(lactic acid) (PLA) or poly(lactic-co-glycolic acid) (PLGA).

It is also envisioned that other types of surface treatment with other reagents may be possible. However, it is preferred that the type or extent of the surface treatment, as well as any other components of the coating, do not entirely prevent the release of fertilizer and are not harmful to the plant, the soil, or the greater ecosystem. In one embodiment, the anticaking agent is biodegradable. A biodegradable material is defined as a material that is capable of being broken down into innocuous products by the action of living beings (i.e., microorganisms). A biodegradable material is able to degrade and mineralize as a consequence of microbial enzymatic attack by microorganisms such as bacteria, fungus, algae, and protozoans. Biodegradation may occur anaerobically as well as aerobically. Ionization and/or oxidation may not be required. Preferably the agent, added to a soil, biodegrades in less than 2 years, preferably in less than 1 year or less than 9 months.

In a related embodiment, the anticaking agent may be compostable. A compostable material is a material which undergoes physical, chemical, thermal, and/or biological degradation in a municipal solid waste composting facility such that it enters into and is physically indistinguishable from the finished compost (humus), and which material ultimately mineralizes (biodegrades to carbon dioxide, water, and biomass) in the environment at a rate equivalent to that of known compostable materials in municipal solid waste such as paper and yard waste. Generally, compounds that are biodegradable are also compostable. Where the anticaking agent is biodegradable, a fertilizer mixed with the anticaking agent, or the anticaking agent itself, may be safely added to a compost stream.

In one embodiment, the anticaking agent may be in the form of granules with a core-shell structure. Preferably the shell comprises the coating and the core comprises coarse and fine minerals, however, other arrangements may be possible, such as a particle of a coarse mineral having a coating and decorated with particles of a fine mineral. Another possible arrangement may be a plurality of fine minerals held together by the coating to form an agglomeration, the entire agglomeration attached to one or more particles of coarse mineral. In other embodiments, some granules may comprise only one particle of coarse or fine mineral. Very likely, the anticaking agent may have a wide mixture of granules having the previously mentioned arrangements, and more arrangements may be possible.

Where the anticaking agent is in the form of granules with a core-shell structure, with the coating as the shell, and one or more mineral particles as the core, the ratio of the average shell layer thickness to the average core diameter may be 100:1-1:100, preferably 20:1-1:20, more preferably 5:1-1:5, or even more preferably 3:1-1:3. Preferably at least 70%, more preferably at least 80% of the surface area of the core is in direct contact with the shell layer. In one embodiment, the shell layer may comprise pores that connect with the surface of the core, with the shell layer having a pore size and porosity as those previously described.

FIGS. 1A and 1B show cross-section views of the mineral matrix 2, or coarse and fine mineral particles 2 being embedded by a coating 1. In the embodiment shown in FIG. 1A, the mineral particles are completely surrounded by the coating 1, while in FIG. 1B, some mineral particles are only partially surrounded by the coating. In FIGS. 1A and 1B, the coating may be considered a shell coating multiple cores.

FIGS. 2A and 2B show cross-sections of two different embodiments of core-shell structures. FIG. 2A is a more rounded granule than FIG. 2B, and the shell 4 of FIG. 2A completely encapsulates the core 3. In FIG. 2B, part of the core 3 is exposed as the shell layer 4 does not completely cover the entire surface of the core.

In one embodiment, the anticaking agent itself, or the coarse and/or fine mineral components within a granule of the anticaking agent, may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be particles or granules of the anticaking agent having a mean diameter as previously described.

In other embodiments, the anticaking agent of the invention may be utilized to coat materials other than fertilizer. Indeed, just about any particulate solid material which has a tendency to cake may be mixed and coated with the anticaking agent.

However, a preferred embodiment is that the anticaking agent is applied to fertilizer. In one embodiment, the fertilizer or mineral may be a nitrogen source, a phosphorus source, a potassium source, calcium, magnesium, sulfur, copper, manganese, iron, zinc, or boron. Commonly used fertilizers and minerals include, but are not limited to, calcium sulfate, urea, calcium nitrate, calcium ammonium nitrate, potassium chloride, potassium nitrate, magnesium ammonium phosphate (referred to as struvite), iron phosphate, ammonium phosphate and ammonium sulfate nitrate. Additional exemplary embodiments of minerals include other urea compounds, anhydrous ammonia, nitrate salts, phosphate salts, ammonium salts and mixtures thereof. The cationic component of the nitrate salts that fall within the scope of the present invention may comprise of sodium, potassium, or calcium for which the corresponding salt has a chemical formula of $Ca(NO_3)_2$.

Urea compounds that fall within the scope of the present invention include urea having a chemical formula of $CO(NH_2)_2$, urea sulfate $CH_4N_2O.H_2SO_4$, urea ammonium nitrate having a chemical formula of $NH_4NO^{3+}CO(NH_2)_{2+}H_2O$, urea ammonium phosphate $CO(NH_2)—NH_3—H_3PO_4—H_2O$, and urea phosphate $CO(NH_2)_2H_3PO_4$.

Phosphate salts that fall within the scope of the present invention include ammonium chloride, ammonium nitrate, ammonium sulfate, mono-ammonium phosphate, diammonium phosphate, ammonium phosphate-sulfate, ammonium polyphosphate.

The ammonium salt mineral source nutrients that fall within the context of the present invention include ammonium chloride $NH_4Cl$, ammonium nitrate $NH_4NO_3$, ammonium sulfate $(NH_4)_2SO_4$, mono-ammonium phosphate $NH_4H_2PO_4$, ammonium thiosulfate $H_8N_2O_3S_2$, diammonium phosphate $(NH_4)_2HPO_4$, ammonium phosphate-sulfate $(NH_4)_2(H_2PO_4)(HSO_4)$ and ammonium polyphosphate $(NH_4PO_3)_n$.

Generally, the cationic component of the mineral source nutrients may include ammonium, calcium, urea, sodium, ferrous cation, ferric cation, manganese, copper, zinc and molybdenum. The complementary anionic components of the mineral source nutrients may include phosphate, sulfate, chloride, thiosulfate, carbonate, hydroxide, acetate, chelate, oxide, nitrate and sulfide. Additional mineral source nutrients that fall within the scope of the present invention include urea, ammonia, sulfur, citric acid, boric acid, oxalic acid, acetic acid, phosphoric acid and mixtures thereof.

In one embodiment, a fertilizer may comprise a carbohydrate source nutrient, which preferably comprises oligosaccharides. Examples of oligosaccharides that fall within the scope of the present invention include, but are not limited to, disaccharides, such as sucrose and lactose, trisaccharide raffinose and tetrasaccharide stachyose. The chemical formula of unmodified disaccharides is $C_{12}H_{22}O_{11}$.

In one embodiment, a fertilizer may comprise a plant growth hormone, including antiauxins, such as, for example, 2,3,5-tri-iodobenzoic acid; auxins, such as, for example, 2,4-D; cytokinins, such as, for example, kinetin; defoliants, such as, for example, metoxuron; ethylene inhibitors; ethylene releasers, such as, for example, ACC and gloxime; gibberellins; growth inhibitors Various fertilizers that are commercially available may also be used. Exemplary soil-based nutrients that may also optionally be added during or after production of the NC-SAP product include plant micro nutrient such as calcium, magnesium, potassium, phosphorus, boron, zinc, manganese, copper, iron, sulfur, nitrogen, molybdenum, silicon, ammonium phosphate, fish meal, organic compounds and additives, organic based fertilizers derived from plant and animal products and derivatives, blends, and mixtures thereof. More information about exemplary growth-promoting additives can be found in *The Farm Chemicals Handbook* published by Meister Publishing Company and incorporated herein by reference in its entirety.

In one embodiment, the fertilizer mixture has a reduced caking when exposed to a relative humidity of 70-90% in air at a temperature of 25-30° C. for 5-14 days, preferably 6-10 days, when compared to a substantially similar hygroscopic fertilizer exposed to similar conditions without the anticaking agent.

In one embodiment, the fertilizer mixture has a reduced caking when exposed to a relative humidity of 70-90% in air at a temperature of 25-30° C. for 5-14 days, preferably 6-10 days, when compared to a substantially similar fertilizer mixture that lacks the coarse mineral.

In one embodiment, the fertilizer mixture has a reduced caking when exposed to a relative humidity of 70-90% in air at a temperature of 25-30° C. for 5-14 days, preferably 6-10 days, when compared to a substantially similar fertilizer mixture that has no fine mineral.

In one embodiment, the fertilizer mixture has the most reduced caking under the previously described conditions when the anticaking agent is a tertiary mixture of coarse mineral, one or more fine minerals, and coating. Without being bound to any theory, the fine mineral may function by coating all surfaces, including pores of the fertilizer, which reduces space for water to enter. The coarse mineral may work by increasing the space between neighboring fertilizer granules, to avoid aggregation and binding. The coating may work by providing a hydrophobic layer, to mitigate or reduce water bridges and hydrogen bonding between a hygroscopic fertilizer and a water molecule.

Figure 9A:
FIG. 9A is a photograph of a fertilizer mixture having a poor anticaking ability (*).
Figure 9B:
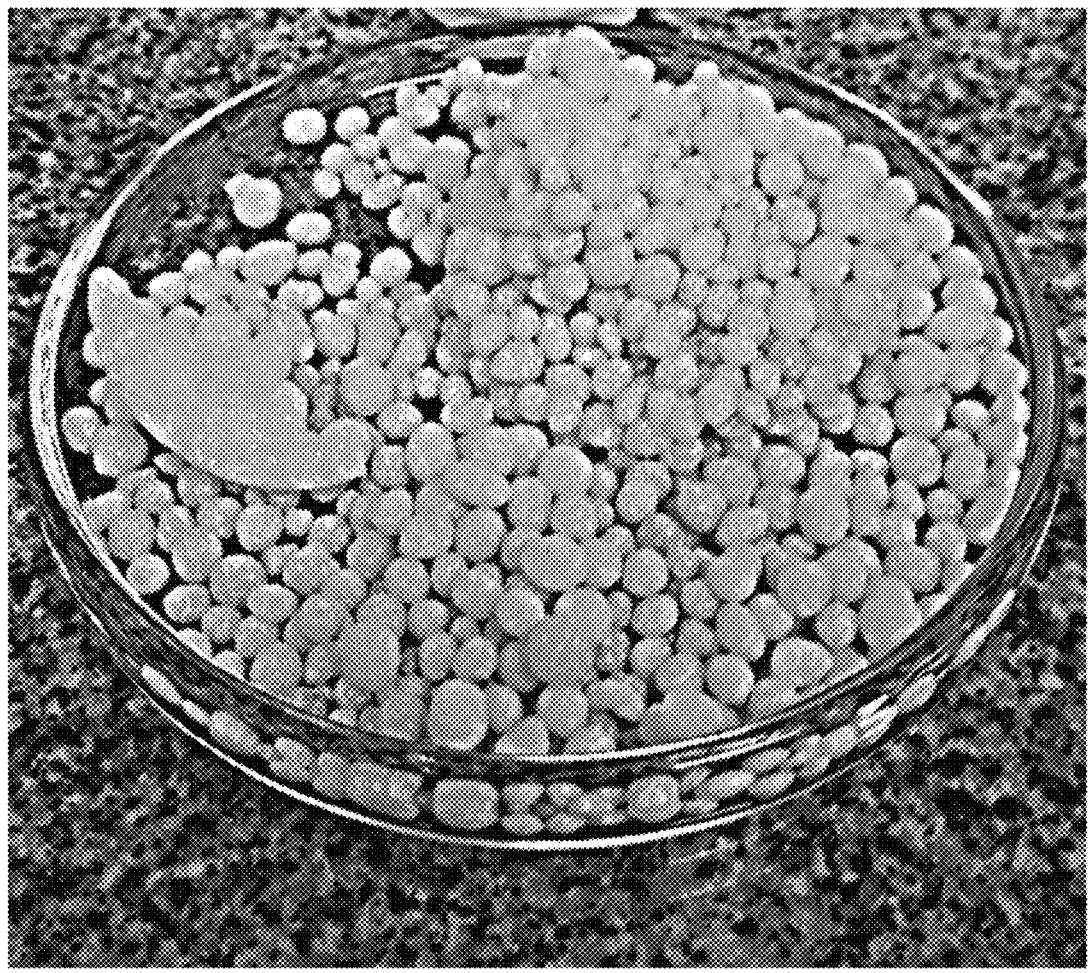
FIG. 9B is a photograph of a fertilizer mixture having an intermediate anticaking ability (, *, or ****).
Figure 9C:
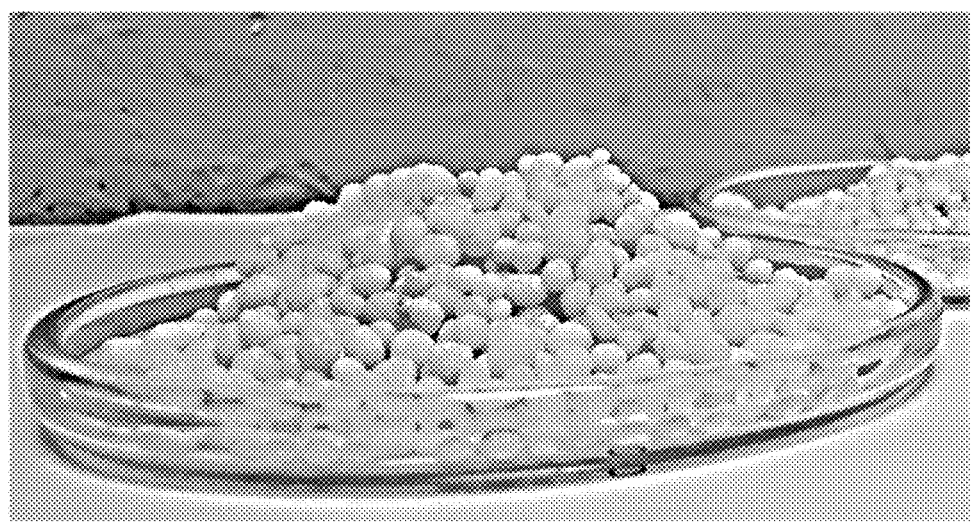
FIG. 9C is a photograph of a fertilizer mixture having a good anticaking ability (*****).

A fertilizer that is caked may agglomerate into a retained shape after being pressed together, similar to wet beach sand or clay. However, the degree of caking may depend on the water content, for instance, wet beach sand will cake, but then loose structural integrity as it dries. Similarly, wheat flour, when dry, may retain a shape, but has a very low structural resistance. Thus, the degree of caking may be measured by the resistance to force, and in some cases may be similar to measuring compressive strength. In other cases, it may be similar to measuring viscosity. A comparison of anticaking ability may or may not involve shaping or compacting a fertilizer mixture. The anticaking ability may be judged by forming a fertilizer mixture with urea and ranking the anticaking visually and assigning a score of 1-5, where 1 represents significant caking, and 5 represents very good anticaking. An example of different scores for different caking and anticaking are shown in FIGS. 9A-9C and described further herein.

In another embodiment, the success of an anticaking agent on a hygroscopic compound or fertilizer may be measured by the amount of water absorbed. For instance, a mass may be measured before and after exposing a fertilizer mixture to warm, humid conditions. A fertilizer without the anticaking agent may absorb at 5-100%, 10-90%, or 15-80% more water than the fertilizer mixture, when both are exposed to similar humidity conditions for the same amount of time.

In another embodiment, the success of an anticaking agent may be determined by a change in particle sizes, where for a similar fertilizer, successful anticaking relates to a smaller average particle size, or less aggregated particles.

According to a third aspect, the present disclosure relates to a fertilizer mixture having reduced caking. The fertilizer mixture comprises 98.0-99.9 wt %, preferably 98.5-99.9 wt %, more preferably 99.0-99.9 wt % of a hygroscopic fertilizer, relative to a total weight of the fertilizer mixture. Though in other embodiments, the fertilizer mixture may comprise less than 99.0 or greater than 99.9 wt % hygroscopic fertilizer. Preferably the fertilizer mixture comprises 0.1-2.0 wt %, preferably 0.1-1.5 wt %, more preferably 0.1-1 wt % of the anticaking agent, relative to a total weight of the fertilizer mixture. However, in other embodiments, the fertilizer mixture may comprise less than 0.1 wt % or greater than 2.0 wt % anticaking agent. In one embodiment, the hygroscopic fertilizer may consist of only urea, though in other embodiments, the hygroscopic fertilizer may a mixture including urea, or may be some other hygroscopic or non-hygroscopic fertilizer, such as the fertilizers described previously. The hygroscopic fertilizer used in the fertilizer mixture may have an initial average particle diameter in a range of 2-6 mm, preferably 2.5-5.5 mm, more preferably 3-5 mm. However, in some embodiments, the hygroscopic fertilizer may have an average particle diameter of less than 2 mm or greater than 6 mm.

In one embodiment, the fertilizer mixture may be in the form of particles or granules having a spherical or substantially spherical shape (i.e., where the sides are rounded or well-rounded) with a sponge-like (i.e., porous) appearance. As defined here, having a substantially spherical shape means that the distance from the particle centroid (center of mass) to anywhere on the particle outer surface varies by less than 30%, preferably by less than 20%, more preferably by less than 10% of the average distance. In some embodiments, a portion of the granules of the fertilizer mixture may be angular (corners sharp and jagged), angular, sub-angular, or sub-rounded and possess a jagged flake-like morphology.

Figure 5A:
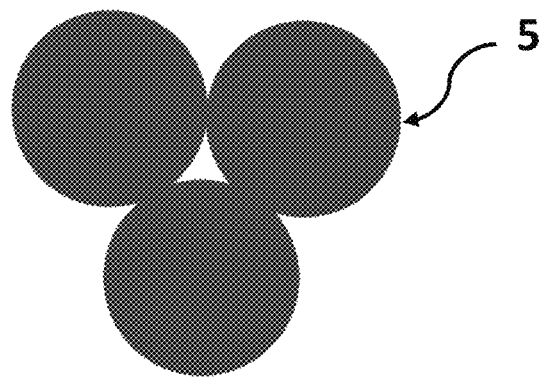
FIG. 5A shows a cartoon of fertilizer granules.
Figure 5B:
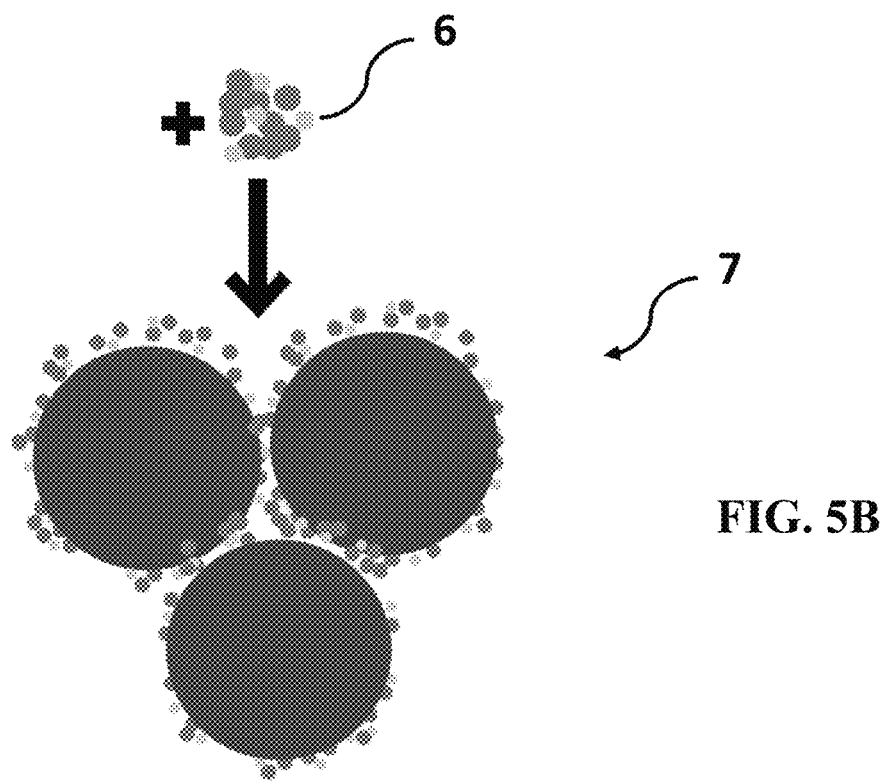
FIG. 5B shows the fertilizer granules in FIG. 5A, after mixing with an anticaking agent.

In one embodiment, the fine mineral of the anti-caking agent self assembles into a coating on the fertilizer granule. This coating reduces the solubility of the fertilizer, or otherwise, the coating reduces the hygroscopic nature of the fertilizer by blocking exposure to humidity. In one embodiment, the coarse minerals act as spacers, preventing contact between the fertilizer granules. The coarse minerals also block the formation of salt bridges, which can form when hygroscopic fertilizer granules begin to solubilize in warm and humid environments. Relating to this embodiment, FIGS. 5A and 5B illustrate a fertilizer mixture 7. FIG. 5A shows a cartoon of fertilizer granules 5, which, when mixed with the anticaking agent 6 in FIG. 5B, produce the fertilizer mixer 7 having reduced caking due to the coating of the anticaking agent.

In one embodiment, the granules have an average particle size, or a median particle size, in a range of 0.5-7.5 mm, preferably 1-6 mm, more preferably 2-5 mm. However in some embodiments, the average particle size, or the median particle size, may be smaller than 0.5 mm or greater than 7.5 mm.

In one embodiment, the granules are monodisperse, having a coefficient of variation or relative standard deviation, expressed as a percentage and defined as the ratio of the particle diameter standard deviation ($\sigma$) to the particle diameter mean (μ), multiplied by 100%, of less than 25%, preferably less than 10%, preferably less than 8%, preferably less than 6%, preferably less than 5%. In one embodiment, the granules are monodisperse, having a particle diameter distribution ranging from 80% of the average particle diameter to 120% of the average particle diameter, preferably 85-115%. In another embodiment, the granules are not monodisperse, for instance, they may be considered polydisperse. Here, the coefficient of variation may be greater than 25%, or greater than 37%. In one embodiment, the granules are polydisperse with a particle diameter distribution ranging from 70% of the average particle diameter to 130% of the average particle diameter, preferably ranging from 60-140%, more preferably 50-150%.

Modifications of the coarse and/or fine mineral, as discussed previously, may also be applied to the anticaking agent and/or the fertilizer mixture. For instance, particles of the anticaking agent and/or the fertilizer mixture may be sieved or classified, pelletized, or milled. The particles of the anticaking agent and/or the fertilizer mixture may have overall shapes and structures such as those mentioned for the coarse and/or fine mineral.

In an alternative embodiment, the anticaking ability of the anticaking agent may be assessed by an anti-block test. This involves applying the anticaking agent to plastic films to lessen the adhesion or blocking of the plastic film surface. Anti-block performance may be measured by any appropriate measurement technique now known to the skilled artisan or hereafter discovered. In one embodiment, anti-block performance is measured in a polyethylene (PE) film containing 2000 ppm of the anticaking agent. In one such embodiment, PE films may be extruded into nominal 1.25 mil films, based on Equistar low density polyethylene (LDPE) 345-013 resin, and about 750 ppm of Chemtura Kemamide E Ultra Powder erucamide slip agent is added. Extrusions of the films are performed with a ¾ inch single screw extruder, equipped with a 2.5 inch blown film die, and the films are conditioned for about 24 hours at about 20° C. and about 50% relative humidity. The film samples are then cut, destaticized, and prepared for blocking tests based on, for example, ASTM D 3354.

According to a fourth aspect, the present disclosure relates to a method of making the fertilizer mixture. This method involves mixing the hygroscopic fertilizer and the anticaking agent for 5-20 minutes, preferably 6-15 minutes, more preferably 6-12 minutes. However, the fertilizer and anticaking agent may be mixed for less than 5 minutes or for longer than 20 minutes. Preferably, the hygroscopic fertilizer and anticaking agent are mixed at the compositions previously described. However, in another embodiment, the fertilizer may be mixed or agitated, while the anticaking agent is added until achieving a desired consistency or level of coating. In one embodiment, the mixture may be heated while mixing, for instance, at 30-80° C., preferably 35-50° C., especially if the coating comprises a compound that needs to melt or soften to spread on the fertilizer. In one embodiment, the hygroscopic fertilizer and anticaking agent are mixed with a rotary drum, though may also be mixed with any configuration of blenders, stirrers, fans, blowers, sprayers, heaters, coolers, impellers, stir bars, tumblers, screeners, mills, or other means of agitation.

No matter what method is used to combine the anticaking agent with the fertilizer particles, a critical factor with respect to contact time of anticaking agent with the fertilizer is that contact should only be long enough to obtain a uniform coating. When roll coating or drum mixing is used, the particles should only be mixed for a time sufficient to obtain a uniform particle coating. In some cases, this mixing may be 1-60 minutes, preferably 5-45 minutes, more preferably 8-30 minutes.

Once the anticaking agent is applied to the fertilizer, the fertilizer mixture may need to be cooled. However, the fertilizer mixture may sufficiently cool throughout the mixing process. Forced convective cooling within the coating apparatus may be utilized, but is not necessary. Cooling of the particles, however, aids in the solidification of the applied anticaking agent. The anticaking agent will solidify by the conduction of heat away from the coating by the relatively cooler underlying fertilizer substrate when the fertilizer particles have been cooled to within the preferred temperature range. If convective cooling of the coated particles is employed, care must be taken to not cool the particles so fast that the coating agent does not have sufficient time to uniformly coat the particles.

The coating conditions are such that the weight of coating applied is that which provides a sufficiently protective coating. Small amounts of anticaking agent may not sufficiently coat the fertilizer. However, if an excess of anticaking agent is applied, additional costs may be incurred without any further benefits being realized.

The examples below are intended to further illustrate protocols for preparing and characterizing the anticaking agent, and uses thereof, and are not intended to limit the scope of the claims.

Example 1

Preparation of Anticaking Agent—Mineral Preparation

The minerals or the mineral blend is formed in the desired ratio to form the mineral powders. Then, surface treatments were applied to the mineral powders in a ribbon blender following a common industrial process.

Example 2

Test Methodology—Non-Pressure Caking

In a rotating bench drum, 99.5 g of urea and 0.5 g of the anticaking agent are added to obtain 100 g of 0.5% coated product. If a different concentration of coating is desired, the quantities should be recalculated, totaling 100 g.

The material is shaken, at a frequency of 3 Hz, for two periods of 5 minutes. The interval is only to check if there is accumulated material on the drum wall.

After the 10 minutes of stirring, the material is withdrawn and stored for analysis. Table 1 shows the name and type of minerals used in different preparations of the anticaking agent. Particle size parameters $d_{10}$, $d_{50}$, $d_{99}$, and $d_{average}$, are presented in units of μm.

TABLE 1

Identities of coarse and fine minerals used.

| MINERAL | YEAR OF ANALYSIS | $d_{10}$ | $d_{50}$ | $d_{99}$ | $d_{average}$ | Type |
|---|---|---|---|---|---|---|
| Alphatex HP | 2018 | 0.75 | 1.82 | 6.83 | 2.4 | Calcined Kaolin Clay |
| Luzenac A3 | TDS | 0.6 | 1.1 | 5 | | Talc |
| Barralim Plus | 2018 | 0.12 | 2.44 | 5.13 | 2.1 | Calcium Carbonate |
| EcoFlat Fines | 2014 | 1.56 | 6.49 | 23.57 | 7.91 | Diatomaxeous Earth |
| Calcium Carbonate | 2014 | 1.13 | 9.37 | 35.11 | 11.04 | Carbonate |
| Itasil 2115G | 2014 | 0.72 | 2.91 | 20.45 | 4.45 | Calcined Kaolin Clay |
| Itasilex 3100 | 2014 | 0.48 | 1.81 | 8.99 | 2.5 | Calcite |
| Itatalc 200A | 2018 | 8.49 | 30.86 | 89.42 | 33.82 | Talc |
| Itatalc 635A | 2014 | 3.26 | 9.49 | 22.40 | 9.73 | Kaolin 45-85% Talc 15-45% |
| Sac 200ZA | 2014 | 1.06 | 3.86 | 17.89 | 5.06 | Calcined Kaolin Clay |
| Saca B | 2017 | 0.31 | 2.65 | 9.71 | 3.09 | Kaolin |
| Saca C | 2016 | 0.25 | 0.67 | 4.07 | 0.85 | Kaolin |
| Saca C1 | 2014 | 0.08 | 0.39 | 3.01 | 0.71 | Kaolin |
| Saca P | 2016 | 0.53 | 1.41 | 7.29 | 1.83 | Kaolin |
| Saca SFC | 2016 | 0.36 | 2.05 | 13.51 | 3.23 | Kaolin |

Analysis 10 g of the previously prepared material is placed in a 50 mL beaker in a controlled environment (desiccator with sulfuric acid solution) at 27° C. and 80% relative humidity for 9 days. After this period, the material is evaluated visually and classified qualitatively according to its fluidity (free-flow or caked). For instance, the beaker may be tilted into a horizontal position, or tilted as far as possible without spilling any materials. The beaker may then be rotated around its central axis to determine a degree of caking. Fertilizer grains that slide freely are considered to be free-flowing.

Figure 6A:
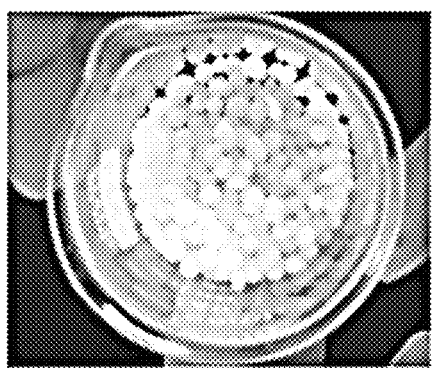
FIG. 6A shows a top view of a beaker containing a fertilizer mixture with an intermediate anticaking ability.
Figure 6B:
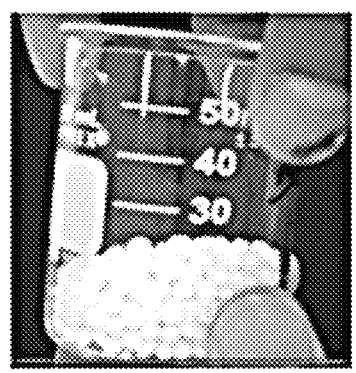
FIG. 6B shows a side view of the beaker of FIG. 6A being tilted.
Figure 7A:
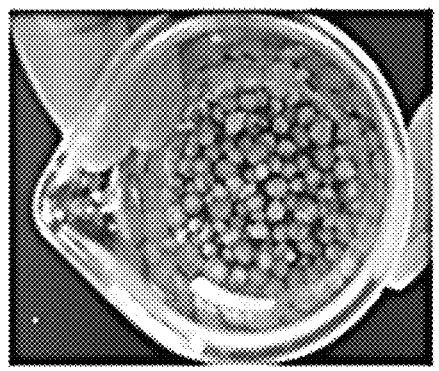
FIG. 7A shows a top view of a beaker containing a fertilizer mixture with a poor anticaking ability
Figure 7B:
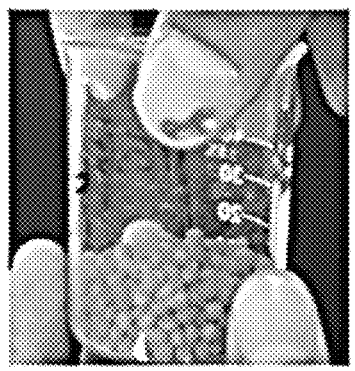
FIG. 7B shows the side view of the beaker in FIG. 7A being tilted.
Figure 7C:
FIG. 7C shows the beaker of FIG. 7B being completely inverted with the fertilizer mixture stuck in the beaker.
Figure 8A:
FIG. 8A shows a top view of a beaker containing a fertilizer mixture with a good anticaking ability.
Figure 8B:
FIG. 8B shows a side view of the beaker of FIG. 8A being tilted and having a free flow of fertilizer granules.

FIGS. 6A-6B, 7A-7C, and 8A-8B show photographs of different fertilizer samples after the 9 day period, and at different inspection angles of the beaker. FIG. 6A shows a top view of a beaker containing a fertilizer mixture with an intermediate anticaking ability, and FIG. 6B shows the beaker of FIG. 6A being tilted. FIG. 7A shows a top view of a beaker containing a fertilizer mixture with a poor anticaking ability, with the same beaker being tilted in FIG. 7B. In FIG. 7C, the same beaker is completely inverted with the fertilizer mixture stuck and clumped in the beaker. FIG. 8A shows a top view of a beaker containing a fertilizer mixture with a good anticaking ability, and tilting the beaker in FIG. 8B shows a free flow of fertilizer granules.

Results and composition of each anticaking sample are shown in FIG. 3, with the results ranked from one-star (*, minimal anticaking) to five-stars (*****, very good anticaking). FIGS. 9A-9B show photographs of anticaking samples having different anticaking abilities. These anticaking samples have been poured out of the beakers after their 9 day exposure to humidity. FIG. 9A has a one-star (*) rating as nearly all granules are caked together as a single block having the form of the beaker. FIG. 9B has an intermediate caking ability, which may be scored 2 to 4 stars (, *, or **). About half of the granules are caked together while half are separated. FIG. 9C shows an anticaking sample with a score of 5 stars (***), as all granules were observed to flow freely and without clumping.

Example 3

Additional samples were prepared and analyzed generally as described in Example 2. The control uses a mineral anticaking agent comprising 100% of a talc having a $d_{50}$ of 9.49 microns. The remaining samples use the indicated mixtures of calcined kaolin (d50 1.82 microns), diatomite (d50 6.49 microns), and the indicated coating agent.

It was hypothesized that the hydrophobized mineral anticaking agent could potentially also act as a compatibilizing agent for otherwise incompatible fertilizers like urea and ammonium nitrate. Accordingly, in addition to the tests done in the previous samples, the ability of the anticaking agent to act as a compatibilizer was tested as follows.

A simple mixture 1:1 of ammonium nitrate without treatment and urea with different mineral anticaking treatments, and following the amount of water absorbed by the mixture in standard atmospheric conditions. The mixture of urea and ammonium nitrate has a very low critical humidity (around 18%), so the ability of the mineral anticaking agent to act as a compatibilizer can be seen as a reduction in the amount of water the mixture absorbs.

Figure 11:
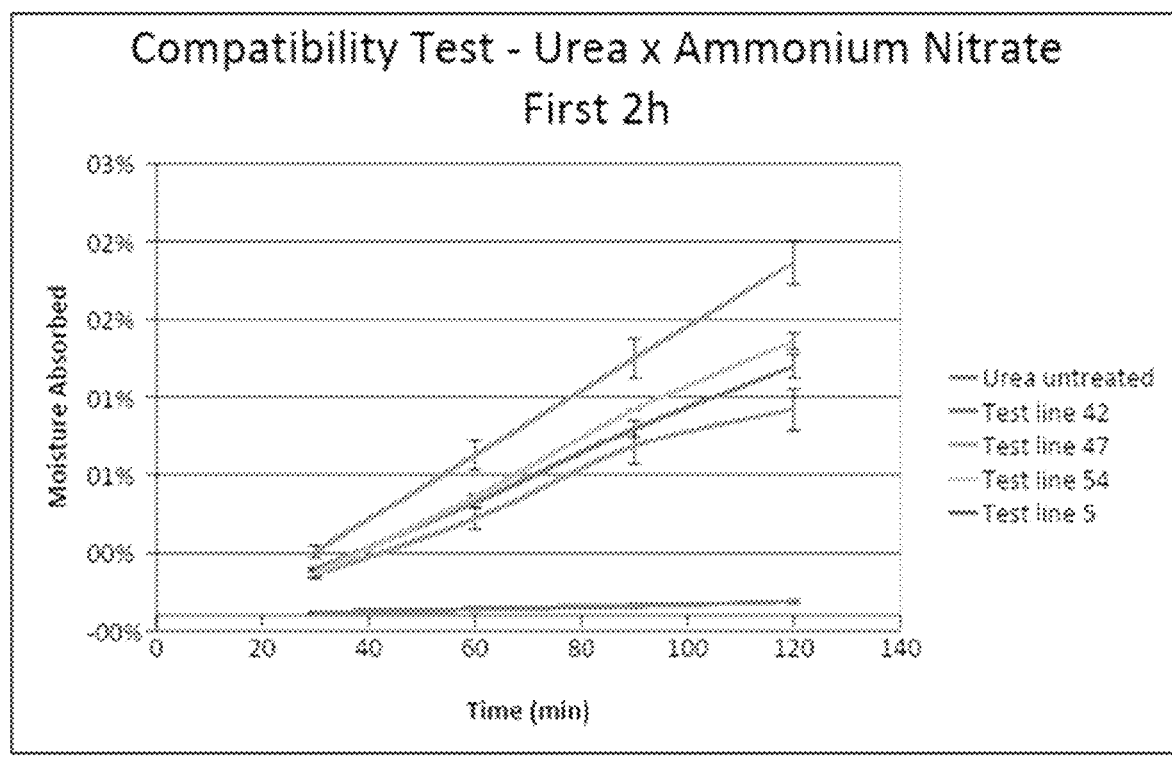
FIG. 11 is a graph illustrating moisture absorption over time.
Figure 12:
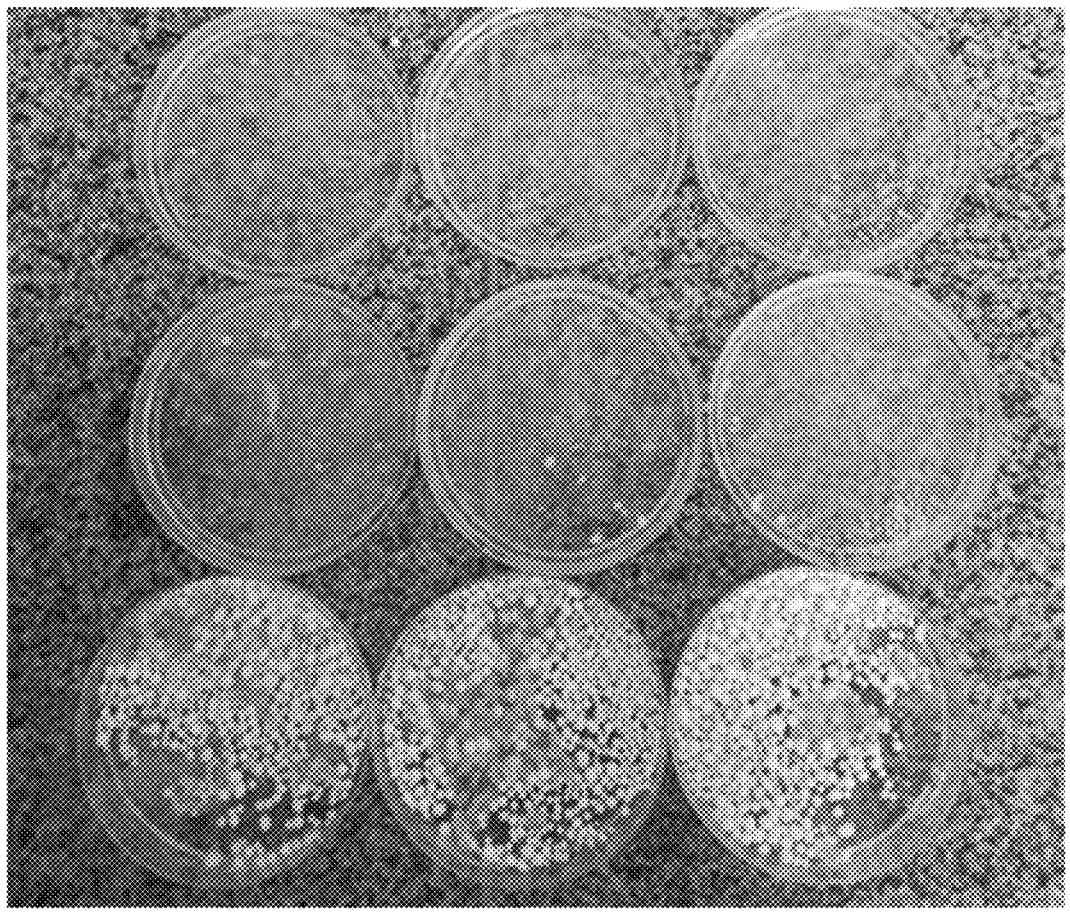
FIG. 12 shows a comparison of the relative amount of dissolution of pellets as follows (in triplicate): the top row is an untreated mixture of urea untreated and ammonium nitrate; the middle row is sample Test Line 47, a mixture of equal parts calcined kaolin and diatomite with a coating of 7.5% of Silicone (2:1) Silquest Silane; the bottom row is Test Line 42, a mixture of equal parts calcined kaolin and diatomite with a coating of Comarlub (Sodium Soap).

The results are shown in FIGS. 10 and 11. FIG. 10 is a table showing the relevant mixtures and Qualitative assessment scores of anticaking ability and compatibilizer ability. FIG. 11 is a graph illustrating moisture absorption over time. FIG. 12 shows a comparison of the relative amount of dissolution of pellets as follows (in triplicate): the top row is an untreated mixture of urea untreated and ammonium nitrate; the middle row is sample Test Line 47, a mixture of equal parts calcined kaolin and diatomite with a coating of 7.5% of Silicone (2:1) Silquest Silane; the bottom row is Test Line 42, a mixture of equal parts calcined kaolin and diatomite with a coating of Comarlub (Sodium Soap).

As can be seen in FIG. 11, in the first 2 hours of testing there is no significant absorption of ambient humidity by the treated product in sample Test Line 42, while all other products tested had similar behavior to untreated urea. This demonstrates that the anticaking agent used in Test Line 42 is acting both as an anticaking agent and a compatibilizer for the mixing of incompatible fertilizers such as urea and ammonium nitrate.

The invention claimed is:

1. An anticaking agent, comprising:
   20-80 wt % coarse mineral, having a median particle diameter ($d_{50}$) in a range of 4-20 μm;
   20-80 wt % one or more fine minerals, having a median particle diameter ($d_{50}$) in a range of 1-3.5 μm; and
   1-30 wt % coating, each weight percentage relative to a total weight of the anticaking agent,
   wherein the coarse mineral and the one or more fine minerals comprise a mineral selected from the group consisting of perlite, diatomaceous earth, talc, calcium carbonate, kaolin, and calcined kaolin, wherein the coarse mineral comprises different minerals than the one or more fine minerals, wherein the coating is silicone oil, silane, or both, wherein the anticaking agent has a median particle diameter in a range of 2-50 µm, and wherein the coarse mineral and the one or more fine minerals form a mineral matrix held together by the coating.

2. The anticaking agent of claim 1, wherein the coarse mineral is diatomaceous earth, the diatomaceous earth comprising:
at least 94 wt % silica ($SiO_2$), and
less than 1 wt % crystalline silica, each relative to a total weight of the diatomaceous earth.

3. The anticaking agent of claim 1, wherein the coarse mineral comprises diatomaceous earth, wherein the diatomaceous earth comprises a natural amorphous silica product derived from diatomaceous earth.

4. The anticaking agent of claim 1, wherein the one or more fine minerals consists of talc, calcined kaolin, or both, and
wherein the coating comprises silicone oil, silane, or both.

5. The anticaking agent of claim 4, wherein the silane comprises octyltriethoxysilane and/or vinyltrimethoxysilane, and the silicone oil comprises polydimethylsiloxane.

6. The anticaking agent of claim 4, wherein the coating consists of silicone oil and silane.

7. A method of making the anticaking agent of claim 1, comprising:
mixing the coarse mineral with the one or more fine minerals to produce a mineral mixture; and
applying the coating to the mineral mixture to produce the anticaking agent.

8. The method of claim 7, wherein the mineral mixture is suspended in a solution, and the method further comprises drying the anticaking agent.

9. The method of claim 7, wherein the applying involves spraying the coating onto the mineral mixture.

10. The method of claim 7, wherein the applying involves silanization of the mineral mixture.

11. The method of claim 7, wherein the coarse mineral has a specific surface area in a range of 3-15 $m^2/g$.

12. The method of claim 7, wherein the coarse mineral has a pore volume in a range of 1.3-2.5 mL/g.

13. The anticaking agent of claim 1, wherein the fine minerals have a median particle diameter ($d_{50}$) in a range of 1.2-3.2 µm.

14. A fertilizer mixture having reduced caking, comprising:
98.0-99.9 wt % of a hygroscopic fertilizer; and
0.1-2.0 wt % of the anticaking agent of claim 1, each relative to a total weight of the fertilizer mixture,
wherein the fertilizer mixture is in the form of granules having an average particle size in a range of 1.0-7.5 mm.

15. The fertilizer mixture of claim 14, wherein the hygroscopic fertilizer comprises urea.

16. The fertilizer mixture of claim 14, having a reduced caking when exposed to a relative humidity of 70-90% in air at a temperature of 25-30° C. for 5-14 days, when compared to a hygroscopic fertilizer without the anticaking agent.

17. The fertilizer mixture of claim 14, having a reduced caking when exposed to a relative humidity of 70-90% in air at a temperature of 25-30° C. for 5-14 days, when compared to a fertilizer mixture that lacks the coarse mineral.

18. The fertilizer mixture of claim 14, having a reduced caking when exposed to a relative humidity of 70-90% in air at a temperature of 25-30° C. for 5-14 days, when compared to a fertilizer mixture that has no fine mineral.

19. A method of making the fertilizer mixture of claim 14, the method comprising:
mixing the hygroscopic fertilizer and the anticaking agent for 5-20 minutes to produce the fertilizer mixture.

20. The method of claim 19, wherein the hygroscopic fertilizer has an average particle diameter in a range of 2-6 mm.

21. The method of claim 19, wherein the hygroscopic fertilizer and the anticaking agent are mixed with a rotary drum.

* * * * *